US011334529B2

(12) United States Patent
Dhanabalan et al.

(10) Patent No.: US 11,334,529 B2
(45) Date of Patent: May 17, 2022

(54) RECOMMENDING FILES FOR FILE SHARING SYSTEM

(71) Applicant: Citrix Systems, Inc., Fort Lauderdale, FL (US)

(72) Inventors: Praveen Raja Dhanabalan, Bangalore (IN); Anudeep Athlur, Bangalore (IN); Anuj Magazine, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 276 days.

(21) Appl. No.: 16/774,448

(22) Filed: Jan. 28, 2020

(65) Prior Publication Data
US 2021/0232542 A1 Jul. 29, 2021

(51) Int. Cl.
| | |
|---|---|
| *G06F 16/176* | (2019.01) |
| *G06F 16/14* | (2019.01) |
| *G06F 16/2457* | (2019.01) |
| *G06F 21/62* | (2013.01) |
| *H04L 67/06* | (2022.01) |
| *G06Q 10/10* | (2012.01) |

(52) U.S. Cl.
CPC ......... *G06F 16/176* (2019.01); *G06F 16/148* (2019.01); *G06F 16/156* (2019.01); *G06F 16/24578* (2019.01); *G06F 21/6218* (2013.01); *H04L 67/06* (2013.01); *G06Q 10/10* (2013.01)

(58) Field of Classification Search
CPC ............. G06F 16/24578; G06F 16/148; G06F 16/156; G06F 16/176; G06F 16/14; G06F 21/6218; G06Q 10/10; H04L 67/06
See application file for complete search history.

(56) References Cited

U.S. PATENT DOCUMENTS

| | | | | |
|---|---|---|---|---|
| 7,747,627 | B1 * | 6/2010 | Shetty | G06F 16/122 |
| | | | | 707/741 |
| 8,127,272 | B2 * | 2/2012 | Gownder | G06F 8/35 |
| | | | | 717/106 |
| 11,068,442 | B1 * | 7/2021 | Meyer | G06F 16/358 |
| 2002/0078045 | A1 * | 6/2002 | Dutta | G06F 16/951 |
| 2007/0277229 | A1 * | 11/2007 | Vogel | G06F 21/33 |
| | | | | 726/4 |
| 2008/0313155 | A1 * | 12/2008 | Atchison | G06F 16/93 |

(Continued)

FOREIGN PATENT DOCUMENTS

EP 3206141 A1 8/2017

OTHER PUBLICATIONS

Extended European Search Report issued in European Patent Application No. 20201160.0, dated Mar. 30, 2021, 7 pages.

*Primary Examiner* — Etienne P Leroux
(74) *Attorney, Agent, or Firm* — Pierce Atwood LLP

(57) ABSTRACT

A computing system may perform a method that involves receiving, from a first computing device, a request for a file, where the request identifies at least one user who has access to the file and includes information indicative of the file. The method further includes identifying, based at least in part on the received request, the file within a repository of files, sending, to a second computing device, a first indication of the request to access the file, receiving, from the second computing device, a second indication that the file is to be made accessible via the first computing device, and causing the file to be transferred from the repository to the first computing device.

20 Claims, 15 Drawing Sheets

(56) References Cited

U.S. PATENT DOCUMENTS

| | | | |
|---|---|---|---|
| 2009/0063430 A1* | 3/2009 | Anglin | G06F 16/40 |
| 2010/0011036 A1 | 1/2010 | Wagner | |
| 2011/0010421 A1* | 1/2011 | Chavez | H04L 12/6418 |
| | | | 709/204 |
| 2011/0313258 A1* | 12/2011 | Chopra | G16H 10/20 |
| | | | 600/300 |
| 2013/0103727 A1* | 4/2013 | Marcotte | G06F 16/13 |
| | | | 707/827 |
| 2014/0101577 A1* | 4/2014 | Kwak | G06F 3/1431 |
| | | | 715/761 |
| 2014/0259190 A1 | 9/2014 | Kiang et al. | |
| 2015/0281390 A1* | 10/2015 | Kovvuri | H04L 67/2842 |
| | | | 709/203 |
| 2015/0310174 A1* | 10/2015 | Coudert | G06F 21/6245 |
| | | | 705/3 |
| 2015/0363609 A1* | 12/2015 | Huang | H04L 67/1097 |
| | | | 713/165 |
| 2018/0314883 A1* | 11/2018 | Saurav | G06F 40/177 |
| 2019/0034446 A1* | 1/2019 | Martinez | G06F 16/9537 |
| 2019/0074967 A1* | 3/2019 | Stuntebeck | H04L 9/14 |
| 2019/0199776 A1* | 6/2019 | Pan | H04L 63/10 |

* cited by examiner

RECOMMENDING FILES FOR FILE SHARING SYSTEM

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves receiving, from a first computing device, a request for a file, the request identifying at least one user who has access to the file and including information indicative of the file; identifying, based at least in part on the received request, the file within a repository of files; sending, to a second computing device, a first indication of the request to access the file; receiving, from the second computing device, a second indication that the file is to be made accessible via the first computing device; and causing, based at least in part on the second indication, the file to be transferred from the repository to the first computing device.

In some embodiments, a system comprises at least one processor and at least one computer-readable medium. The at least one computer-readable is encoded with instructions which, when executed by the at least one processor, cause the system to receive, from a first computing device, a request for a file, the request identifying at least one user who has access to the file and including information indicative of the file; to identify, based at least in part on the received request, the file within a repository of files; to send, to a second computing device, a first indication of the request to access the file; to receive, from the second computing device, a second indication that the file is to be made accessible via the first computing device; and to cause, based at least in part on the second indication, the file to be transferred from the repository to the first computing device In some embodiments, a computing system performs a method that involves receiving a message including information describing a requested file, the message identifying a user who has access to the requested file; analyzing the information to determine at least one feature associated with the requested file; determining a plurality of files that the identified user is authorized to access; determining file tags associated with the plurality of files; comparing the at least one feature with the file tags to determine a list of recommended files from the plurality of files; and causing a computing device of the identified user to display the list of recommended files.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1:
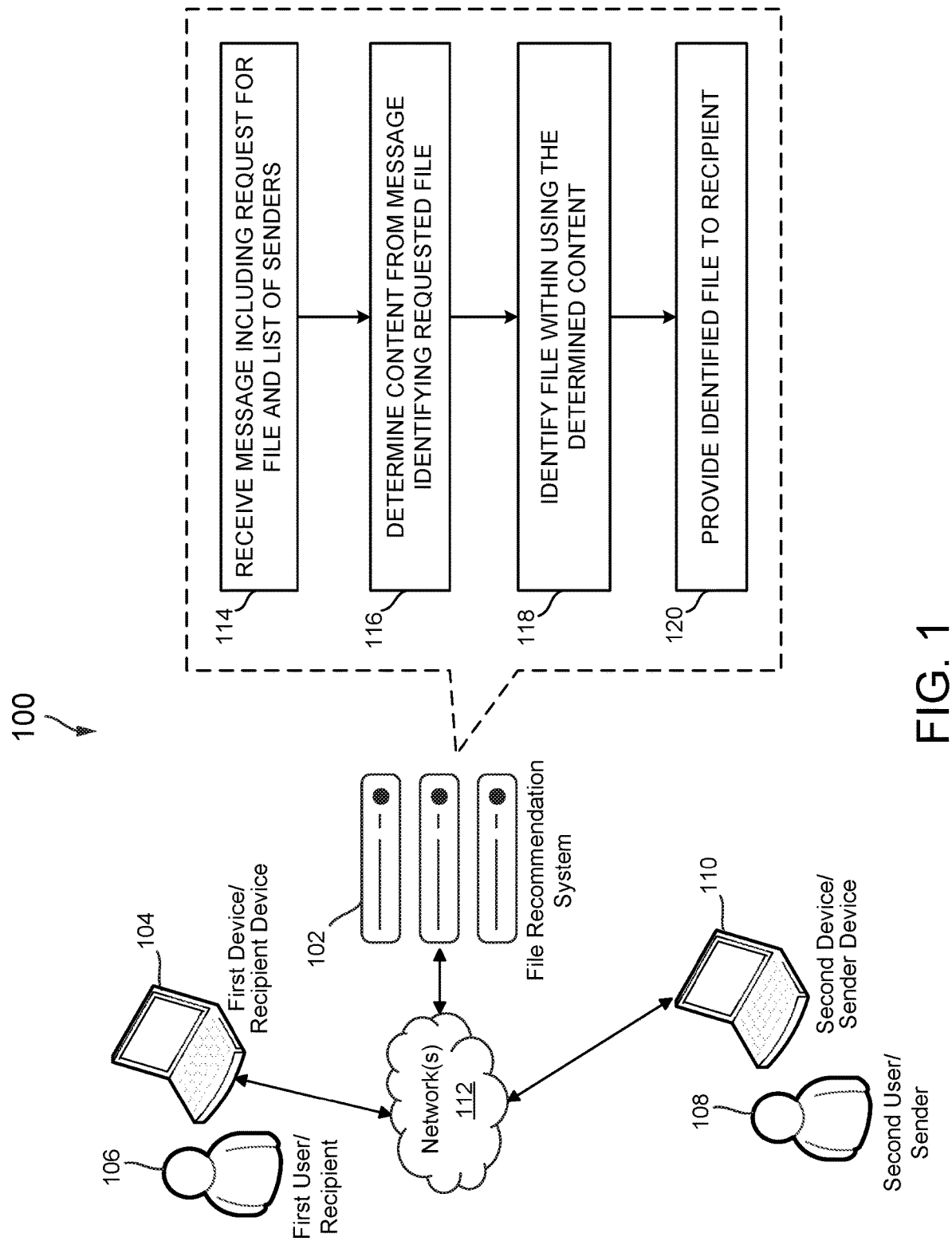
FIG. 1 is a diagram illustrating an example of a file recommendation system in accordance with some embodiments of the present disclosure.

For purposes of reading the description of the various embodiments below, the following descriptions of the sections of the specification and their respective contents may be helpful:

Section A provides an introduction to example embodiments of a file recommendation system;

Section B describes examples of a network environment and computing environment which may be useful for practicing embodiments described herein;

Section C describes example embodiments of systems and methods for delivering shared resources using a cloud computing environment;

Section D describes example embodiments of systems and methods for managing and streamlining access by clients to a variety of resources;

Section E describes example embodiments for providing file sharing over networks;

Section F provides a detailed description of example embodiments of a file recommendation system; and Section G describes example implementations of methods, systems, and computer-readable media in accordance with the present disclosure.

A. Introduction to Illustrative Embodiments of a File Recommendation System

The inventors have recognized and appreciated that, at least in certain circumstances, it may be cumbersome for a user to search through a large number of files to find a particular file that has been requested by another user. For example, within a file sharing system, one user (referred to herein as "sender") may receive a message (from another user, referred to herein as "recipient") requesting one or more files, and the sender may need to search through all the files that the sender is authorized to access to find the requested file(s) to send to the recipient. Due to the time the sender takes to search through many files to find the requested file(s), there may be a significant delay in the recipient receiving the file(s). The inventors have also recognized and appreciated that a sender (from whom the file is requested) may also experience a delay in finding the requested file(s), and may sometimes put off responding to a file request until the sender has some more time.

In accordance with some embodiments of the present disclosure, a file recommendation system may determine a file that the sender is authorized to access and that matches the requested file based on the information included by the recipient in the request. The system, after approval from the sender, may then provide the determined file to the recipient, thus reducing the time and effort spent by the sender in finding the requested file. In some implementations, the system may present the sender with a list of files (from the files the sender is authorized to access) that potentially match the requested file, and the sender may select the matching file from such a list to provide to the recipient in response to the request. In some embodiments, a recipient may request a file from multiple senders, and the system described herein may perform the process of determine a file that matches the requested file for individual senders.

In some embodiments, a recipient may create a request for a file, where the request includes a subject line, a message body describing the requested file, and a list of potential senders, or a group of potential senders (e.g., "all software engineers"), that may have access to the requested file. The system described herein may then parse the request and extract features that can be used to identify the requested file. The system may scan through the files that the potential senders are authorized to access, and may identify a file matching the requested file. After receiving approval from the sender(s), the system may send the identified file to recipient.

FIG. 1 is a diagram illustrating an example system 100 configured to recommend a file that matches a requested file in accordance with some embodiments of the present disclosure. As shown in FIG. 1, the system 100 may include a file recommendation system 102 (e.g., implemented by one or more servers) that is in communication over one or more networks 112 with a first device 104 that may be operated by a first user 106 and a second device 110 that may be operated by a second user 108. The first user 106 may use the first device 104 to request one or more files from the second user 108. As indicated, the first user 106 may be referred to herein as a "recipient" and the device 104 may be referred to herein as a "recipient device." And as also indicated, the second user 108 may be referred to herein as a "sender" and the second device 110 may be referred to herein as a "sender device." In some embodiments, the file recommendation system 102 may include one or more of the components described below in connection with FIG. 7. The first and second devices 104, 110 may, for example, correspond to any of the client devices 202 described herein, including but not limited to, a desktop, a laptop, a mobile device, a tablet, etc. The network(s) 112 may, for example, correspond to one or more of the networks 206 described herein.

As shown in the flow diagram of FIG. 1, the file recommendation system 102 may receive (114) a message including a request for a file and a list of senders who may have access to the requested file. The message may be received from the recipient device 104, and the list of senders may include the sender 108. The message may include information describing the requested file and/or other information that may be used in identifying the file requested by the recipient 104.

The file recommendation system 102 may determine (116) content from the received message identifying the requested file. The file recommendation system 102 may parse the message to identify one or more features associated with the requested file. The file recommendation system 102 may, for example, parse the message to determine a name of the requested file. In some implementations, the file recommendation system 102 may additionally or alternatively determine, from the message, one or more other features, such as file tags associated with the requested file, an age of the requested file, an access frequency of the requested file, a location associated with the file, or the like.

The file recommendation system 102 may identify (118) a file that the sender 108 is authorized to access using the content determined from the message. In some embodiments, the file recommendation system 102 may identify the file within a repository, e.g., a database, storing files that the sender 108 is authorized to access. In some embodiments, the file recommendation system 102 may identify the file from a storage medium for a device that the sender may use to open/read/access the message requesting the file. The file identified by the file recommendation system may match the file requested by the recipient 106. In some embodiments, the repository of files the sender 108 is authorized to access may also include file tags associated with individual files. In such embodiments, the file recommendation system 102 may thus identify the file matching the requested file at least in part by using the determined content and the file tags associated with the files. For example, the file recommendation system 102 may identify the file from the repository based on the filename of the identified file, the age of the identified file, the access frequency of the identified file, a location associated with the identified file, and/or other file tags.

The file recommendation system 102 may provide (120) the identified file to the recipient 106 via the recipient device 104. The file recommendation system 102 may, for example, provide the identified file to the recipient device 104 in response to receiving permission or approval from the sender 108 via the sender device 110 to share the identified file with the recipient 106.

In some embodiments, the file recommendation system 102 may identify more than one file within one or more repositories (storing files the sender 108 is authorized to access) that potentially matches the requested file. In that case, the file recommendation system 102 may present a list of recommended files to the sender 108 via the sender device 110 to enable the sender 108 to select a file to share with the recipient 106 in response to the file request.

Although the illustrated example shows one sender device 110, it should be understood that the file recommendation system 102 may perform the described steps for multiple senders identified by the recipient 106 from whom the file is requested. For example, the file recommendation system 102 may identify a first file from a database storing files that a first sender is authorized to access, a second file from a database storing files that a second sender is authorized to access, and so on.

Additional details and example implementations of embodiments of the present disclosure are set forth below in Section F, following a description of example systems and network environments in or with which such embodiments may be deployed.

B. Network and Computing Environment

Figure 2A:
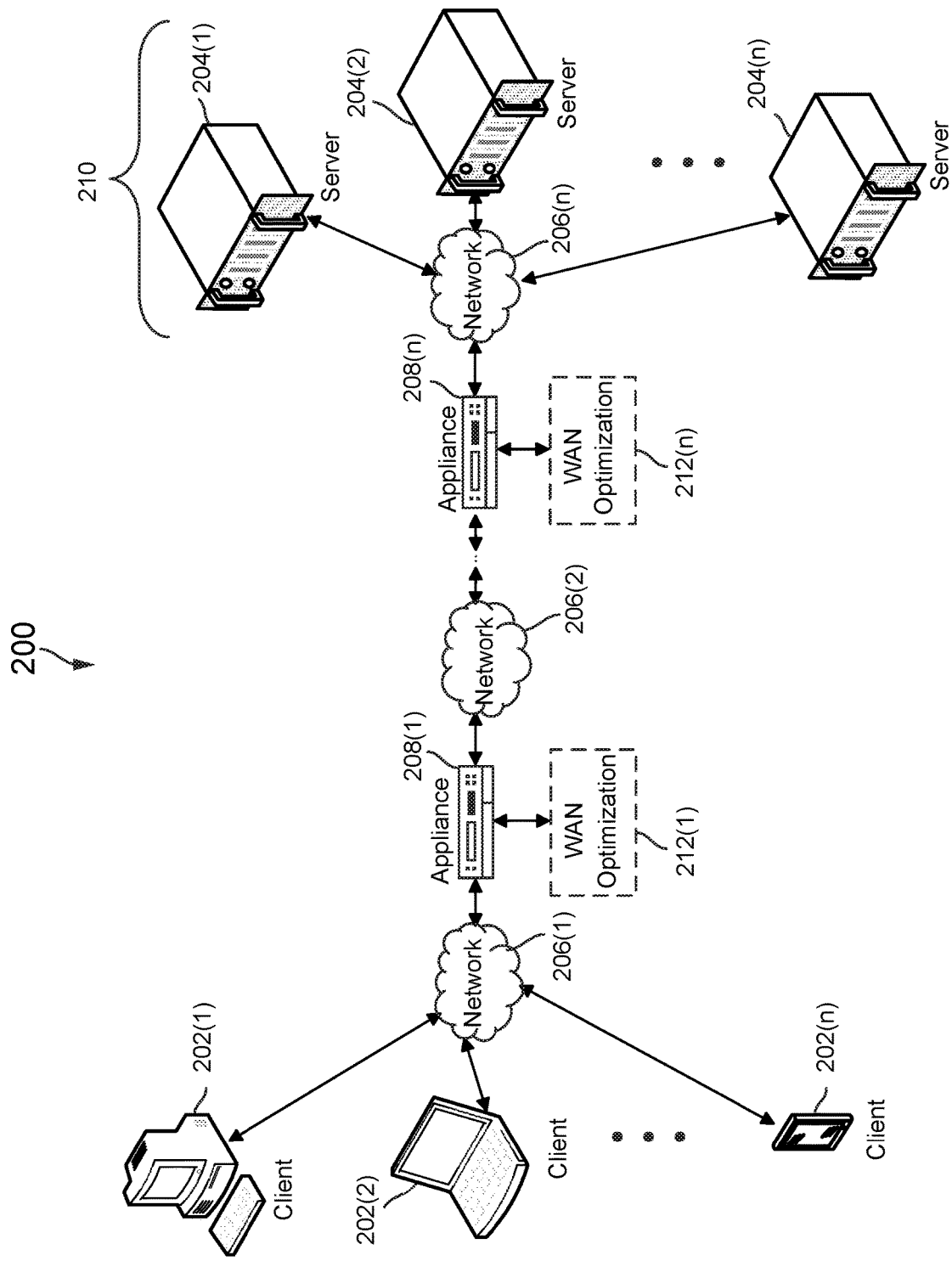
FIG. 2A is a diagram of an example network computing environment in which some embodiments of a file recommendation system disclosed herein may deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208).

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a wide area network (WAN) or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more of the appliances 208 may be implemented as network devices sold by Citrix Systems, Inc., of Fort Lauderdale, Fla., such as Citrix Gateway™ or Citrix ADC™.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, as explained in more detail below, one or more server farms 210 may execute one or more applications on behalf of one or more of clients 202 (e.g., as an application server system) and/or may facilitate the sharing of files between the clients 202 (e.g., as a file sharing system), although other uses are possible, such as a file server, gateway server, proxy server, or other similar server uses. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
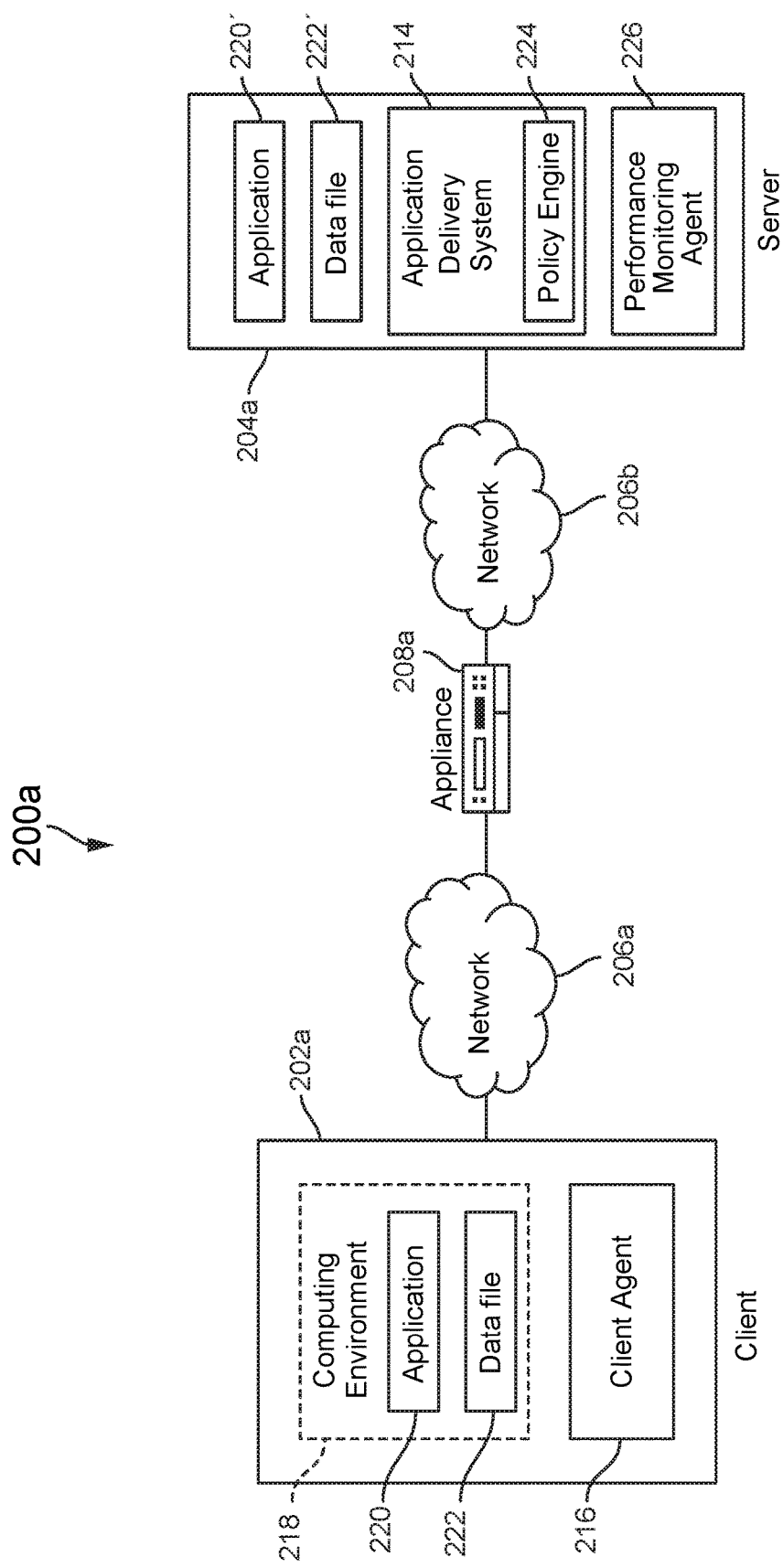
FIG. 2B is a diagram illustrating how a network computing environment like that shown in FIG. 2A may be configured to deliver a computing environment from a server to a client.

Referring to FIG. 2B, an example network environment 200a for delivering and/or operating a computing environment on a client 202a is shown. As shown in FIG. 2B, in some embodiments, a client 202a may include a computing environment 218, and a server 204a may include an application delivery system 214 for delivering a computing environment, application, and/or data files to one or more clients 202.

In some embodiments, each client 202 may additionally include a client agent 216 for establishing and exchanging communications with the appliance 208 and/or the server(s) 204 via a network 206. The client 202a may, for example, have installed and/or execute one or more applications that are in communication with the network 206a. In some embodiments, the client agent 216 may intercept network communications from a network stack used by the one or more applications. For example, the client agent 216 may intercept a network communication at any point in a network stack and redirect the network communication to a destination desired, managed, and/or controlled by the client agent 216, for example, to intercept and redirect a transport layer connection to an IP address and port controlled and/or managed by the client agent 216. The client agent 216 may thus, in some embodiments, transparently intercept any protocol layer below the transport layer, such as the network layer, and any protocol layer above the transport layer, such as the session, presentation, or application layers. The client agent 216 may, for example, interface with the transport layer to secure, optimize, accelerate, route, and/or load-balance any communications provided via any protocol carried by the transport layer.

In some embodiments, the client agent 216 may be implemented as an Independent Computing Architecture (ICA) client developed by Citrix Systems, Inc. The client agent 216 may perform acceleration, streaming, monitoring, and/or other operations. For example, the client agent 216 may accelerate streaming an application from the server 204a to the client 202a. The client agent 216 may also perform endpoint detection/scanning and/or collect endpoint information about the client 202a for the appliance 208a and/or the server 204a. The appliance 208a and/or the server 204a may use the collected information to determine and provide access, authentication, and/or authorization control of the client's connection to the network 206a. For example, the client agent 216 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The computing environment 218 may, for example, execute or operate an application 220 that accesses, processes and/or uses a data file 222. The computing environment 218, application 220 and/or data file 222 may be delivered via an appliance 208a and/or the server 204a.

The appliance 208a may accelerate delivery of all or a portion of the computing environment 218 to the client 202a, for example by the application delivery system 214. For example, the appliance 208a may accelerate delivery of a streaming application 220' and data file 222' processable by the application 220 from a data center to a remote user location by accelerating transport layer traffic between the client 202a and the server 204a. Such acceleration may be provided by one or more techniques, such as: 1) transport layer connection pooling, 2) transport layer connection multiplexing, 3) transport control protocol buffering, 4) compression, 5) caching, or other techniques. The appliance 208a may also provide load balancing of servers 204 in a server farm 210 (shown in FIG. 2A) to process requests from the clients 202, act as a proxy or access server to provide access to the one or more servers 204, provide security and/or act as a firewall between the clients 202 and the servers 204, provide Domain Name Service (DNS) resolution, provide one or more virtual servers or virtual internet protocol servers, and/or provide secure virtual private network (VPN) connections from the clients 202 to the servers 204, such as a secure socket layer (SSL) VPN connection and/or provide encryption and decryption operations.

The application delivery system 214 may deliver the computing environment 218 to a user (e.g., client 202a), remote or otherwise, based on authentication and authorization policies applied by a policy engine 224. A remote user may obtain a computing environment and access to server stored applications 220' and data files 222' from any network-connected device (e.g., the client 202a). For example, the appliance 208a may request an application 220' and data file 222' from the server 204a. In response to the request, the application delivery system 214 and/or the server 204a may deliver the application 220' and data file 222' to the client 202a, for example via an application stream to operate in the computing environment 218 on client the 202a, or via a remote-display protocol or otherwise via remote-based or server-based computing. In an embodiment, application delivery system 214 may be implemented as any portion of the Citrix Workspace™ and Citrix Virtual Apps and Desktops™ by Citrix Systems, Inc., of Fort Lauderdale, Fla.

The policy engine 224 may control and manage the access to, and execution and delivery of, applications. For example, the policy engine 224 may determine the one or more applications a user or client 202 may access and/or how the application should be delivered to the user or client 202, such as a server-based computing, streaming or delivering the application locally to the client 202 for local execution.

For example, in operation, the client 202a may request execution of an application (e.g., application 220') and the application delivery system 214 of the server 204a may determine how to execute the application 220', for example based upon credentials received from the client 202a and a user policy applied by the policy engine 224 associated with the credentials. For example, the application delivery system 214 may enable the client 202a to receive application-output data generated by execution of the application on the server 204a, may enable client the 202a to execute the application 220 locally after receiving the application from the server 204a, or may stream the application via one or more networks 206a, 206b to the client 202a. For example, in some embodiments, the application 220 may be a server-based or a remote-based application executed on the server 204a on behalf of the client 202a. The server 204a may display output to the client 202a using a thin-client or remote-display protocol, such as the Independent Computing Architecture (ICA) protocol by Citrix Systems, Inc. The application 220 may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

As shown, one or more servers 204 may also include a performance monitoring service or agent 226. In some embodiments, a dedicated one or more servers 204 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., the client agent 216), one or more servers 204 (e.g., the agent 226) and/or one or more appliances 208 and/or 212 (agent not shown). In general, the monitoring agents (e.g., agent 216 and/or agent 226) may execute transparently (e.g., in the background) to any application and/or user of the device. In some embodiments, the monitoring agent 226 may be implemented as Citrix Analytics™ by Citrix Systems, Inc., of Fort Lauderdale, Fla.

The monitoring agents may, for example, monitor, measure, collect, and/or analyze data on a predetermined frequency, based upon an occurrence of given event(s), or in real time during operation of the network environment 200a. The monitoring agents may monitor resource consumption and/or performance of hardware, software, and/or communications resources of the clients 202, networks 206, appliances 208 and/or 212, and/or servers 204. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for the application delivery system 214. For example, based upon one or more monitored performance conditions or metrics, the application delivery system 214 may be dynamically adjusted, for example periodically or in real-time, to optimize application delivery by the servers 204 to the clients 202 based upon network environment performance and conditions.

In the described embodiments, the clients 202, servers 204, and appliances 208 and/or 212 (appliances 212 are shown in FIG. 2A) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may each correspond to one computing system, a plurality of computing systems, or a network of distributed computing systems such as computing system 246 shown in FIG. 2D.

Figure 2C:
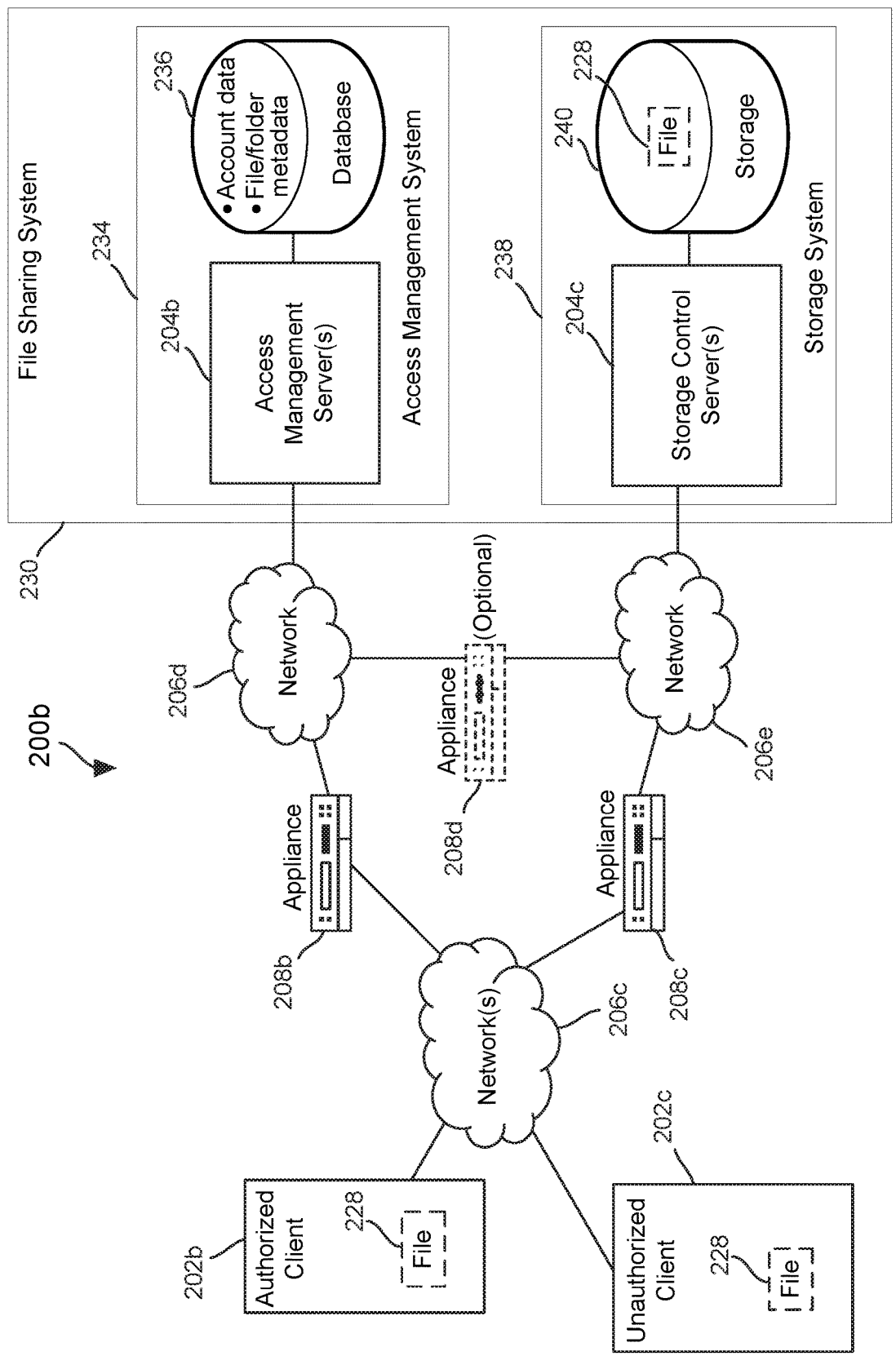
FIG. 2C is a diagram illustrating how a network computing environment like that shown in FIG. 2A may be configured to allow clients access to an example embodiment of a server-based file sharing system.

FIG. 2C shows an example network environment 200b for allowing an authorized client 202b and/or an unauthorized client 202c to upload a file 228 to a file sharing system 230 or download a file 228 from the file sharing system 230. The authorized client 202b may, for example, be a client 202 operated by a user having an active account with the file sharing system 230, while the unauthorized client 202c may be operated by a user who lacks such an account.

As FIG. 2C illustrates, in some embodiments, the file sharing system 230 may include an access management system 234 and a storage system 238. As shown, the access management system 234 may include one or more access management servers 204b and a database 236, and the storage system 238 may include one or more storage control servers 204c and a storage medium 240. In some embodiments, the access management server(s) 204b may, for example, allow a user of the client 202b to log in to his or her account, e.g., by entering a user name and password corresponding to account data stored in the database 236. Once the user of the client 202b has logged in, the access management server 204b may enable the user to view (via the authorized client 202b) information identifying various folders represented in the storage medium 240, which is managed by the storage control server(s) 204c, as well as any files 228 contained within such folders. File/folder metadata stored in the database 236 may be used to identify the files 228 and folders in the storage medium 240 to which a particular user has been provided access rights.

In some embodiments, the clients 202b, 202c may be connected to one or more networks 206c (which may include the Internet), the access management server(s) 204b may include webservers, and an appliance 208b may load balance requests from the authorized client 202b to such webservers. The database 236 associated with the access management server(s) 204b may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202b, 202c are shown is FIG. 2C as stand-alone computers, it should be appreciated that one or both of the clients 202b, 202c shown in FIG. 2C may instead represent other types of computing devices or systems that can be operated by users. In some embodiments, for example, one or both of the authorized client 202b and the unauthorized client 202c may be implemented as a server-based virtual computing environment that can be remotely accessed using a separate computing device operated by users, such as described above in connection with FIG. 2B.

In some embodiments, the access management system 234 may be logically separated from the storage system 238, such that files 228 and other data that are transferred between clients 202 and the storage system 238 do not pass through the access management system 234. Similar to the access management server(s) 204b, one or more appliances 208b-d may load-balance requests from the clients 202b, 202c received from the network(s) 206c (which may include the Internet) to the storage control server(s) 204c. In some embodiments, the storage control server(s) 204c and/or the storage medium 240 may be hosted by a cloud-based service provider (e.g., Amazon Web Services™ or Microsoft Azure™). In other embodiments, the storage control server(s) 204c and/or the storage medium 240 may be located at a data center managed by an enterprise of a client 202, or may be distributed among some combination of a cloud-based system and an enterprise system, or elsewhere.

After a user of the authorized client 202b has properly logged in to an access management server 204b, the server 204b may receive a request from the client 202b for access to one of the files 228 or folders to which the logged in user has access rights. The request may either be for the authorized client 202b to itself to obtain access to a file 228 or folder or to provide such access to the unauthorized client 202c. In some embodiments, in response to receiving an access request from an authorized client, the access management server 204b may communicate with the storage control server(s) 204c (e.g., either over the Internet via appliances 208b and 208c or via an appliance 208d positioned between networks 206d and 206e) to obtain a token generated by the storage control server 204c that can subsequently be used to access the identified file 228 or folder.

In some embodiments, the generated token may, for example, be sent to the authorized client 202b, and the authorized client 202b may then send a request for a file 228, including the token, to the storage control server(s) 202c. In other embodiments, the authorized client 202b may send the generated token to the unauthorized client 202c so as to allow the unauthorized client 202c to send a request for the file 228, including the token, to the storage control server(s) 204c. In yet other embodiments, an access management server 204b may, at the direction of the authorized client 202b, send the generated token directly to the unauthorized client 202c so as to allow the unauthorized client 202c to send a request for the file 228, including the token, to the storage control server(s) 204c. In any of the forgoing scenarios, the request sent to the storage control server(s) may, in some embodiments, include a uniform resource locator (URL) that resolves to an internet protocol (IP) address of the storage control server(s) 204c, and the token may be appended to or otherwise accompany the URL. Accordingly, providing access to one or more clients 202 may be accomplished, for example, by causing the authorized client 202b to send a request to the URL address, or by sending an email, text message or other communication including the token-containing URL to the unauthorized client 202c, either directly from the access management server(s) 204b or indirectly from the access management server(s) 204b to the authorized client 202b and then from the authorized client 202b to the unauthorized client 202c. In some embodiments, selecting the URL or a user interface element corresponding to the URL, may cause a request to be sent to the storage control server(s) 204c that either causes a file 228 to be downloaded immediately to the client that sent the request, or may cause the storage control server 204c to return a webpage to the client that includes a link or other user interface element that can be selected to effect the download.

In some embodiments, a generated token can be used in a similar manner to allow either an authorized client 202b or an unauthorized client 202c to upload a file 228 to a folder corresponding to the token. In some embodiments, for example, an "upload" token can be generated as discussed above when an authorized client 202b is logged in and a designated folder is selected for uploading. Such a selection may, for example, cause a request to be sent to the access management server(s) 204b, and a webpage may be returned, along with the generated token, that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In some embodiments, sending a request including such a token to the storage control server(s) 204c (e.g., by selecting a URL or user-interface element included in an email inviting the user to upload one or more files 228 to the file sharing system 230), a webpage may be returned that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In the described embodiments, the clients 202, servers 204, and appliances 208 and/or 212 (appliances 212 are shown in FIG. 2A) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may each correspond to one computer, a plurality of computers, or a network of distributed computers such as the computing system 246 shown in FIG. 2D.

Figure 2D:
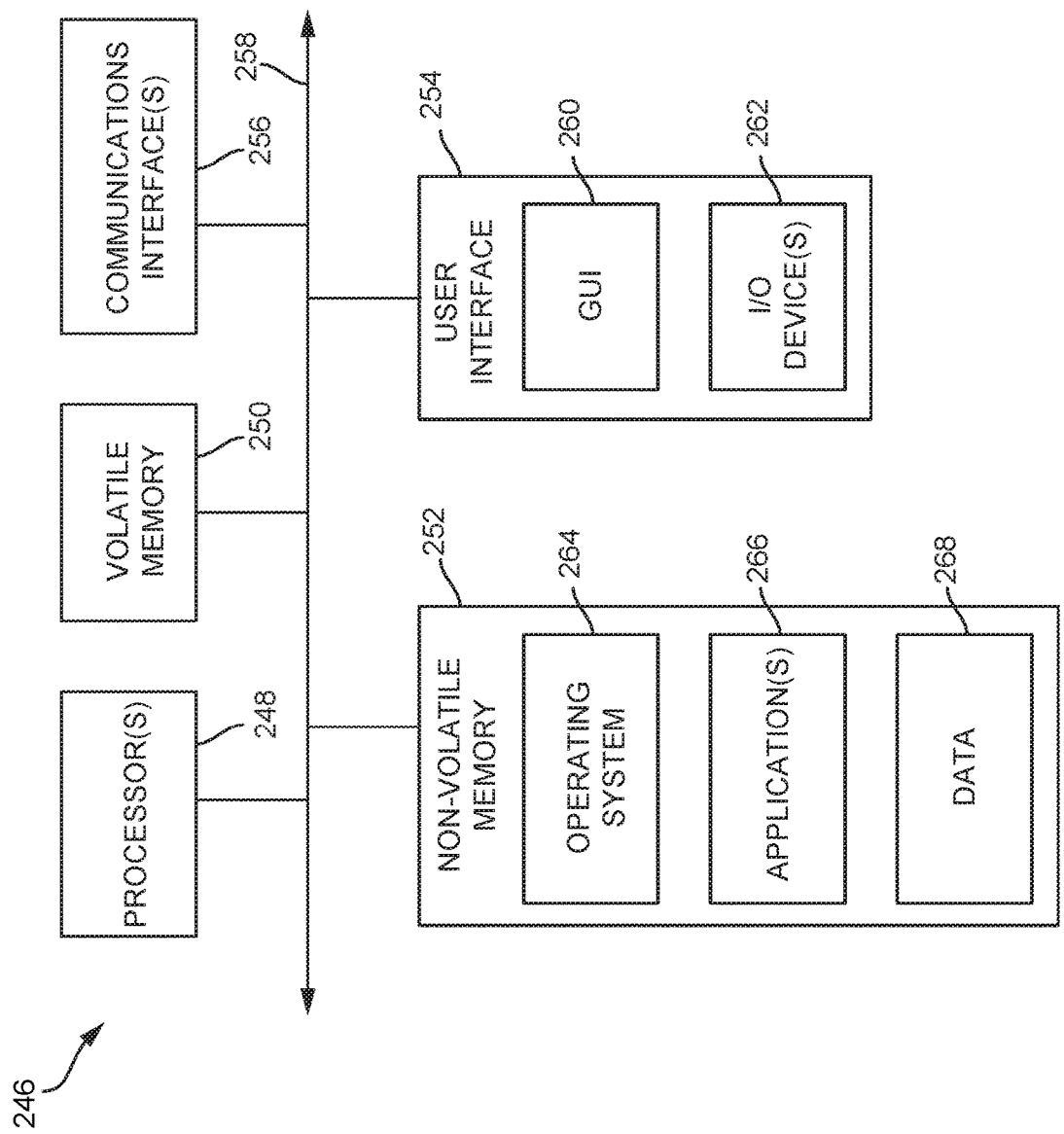
FIG. 2D is a block diagram of an example of a computing system that may be used to implement one or more of the components of the computing environment shown in FIGS. 2A-B.

As shown in FIG. 2D, the computing system 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, camera, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computing system 246 may communicate via communication bus 258. The computing system 246 as shown in FIG. 2C is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computing system 246 to access a computer network such as a LAN, a WAN, or the Internet through a variety of wired and/or wireless or cellular connections.

As noted above, in some embodiments, one or more computing systems 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 3:
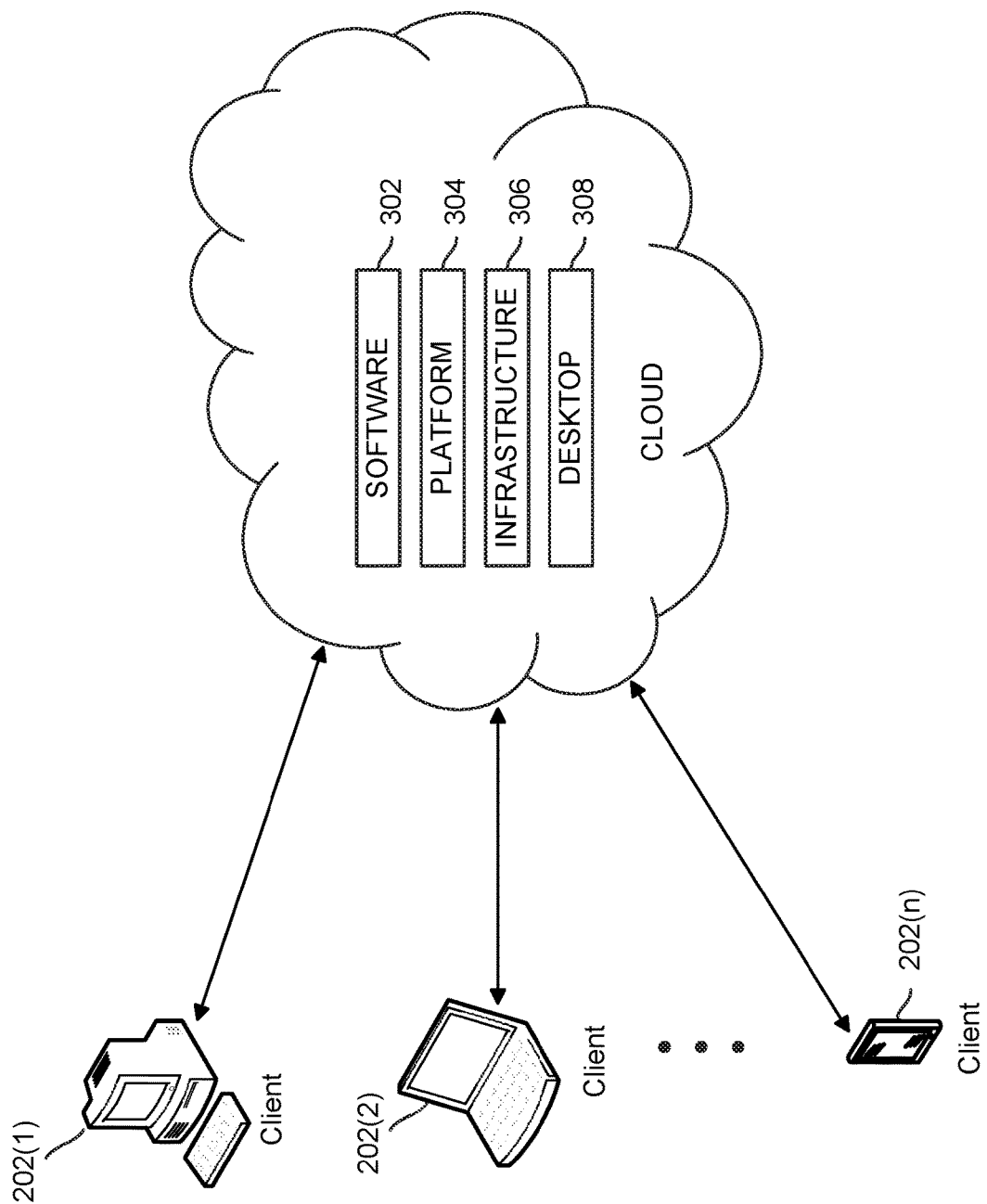
FIG. 3 is a schematic block diagram of an example of a cloud computing environment in which various aspects of the disclosure may be implemented.

C. Systems and Methods for Delivering Shared Resources Using a Cloud Computing Environment Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 202 (such as those described above) are in communication with a cloud network 304. The cloud network 304 may include back-end platforms, e.g., servers, storage, server farms and/or data centers. The clients 202 may correspond to a single organization/tenant or multiple organizations/tenants. More particularly, in one example implementation, the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 202 or the enterprise/tenant. The servers may be located off-site in remote geographical locations or otherwise.

The cloud computing environment 300 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 202. In some embodiments, the cloud computing environment 300 may include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 302, Platform as a Service (PaaS) 304, Infrastructure as a Service (IaaS) 306, and Desktop as a Service (DaaS) 308, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

Figure 4A:
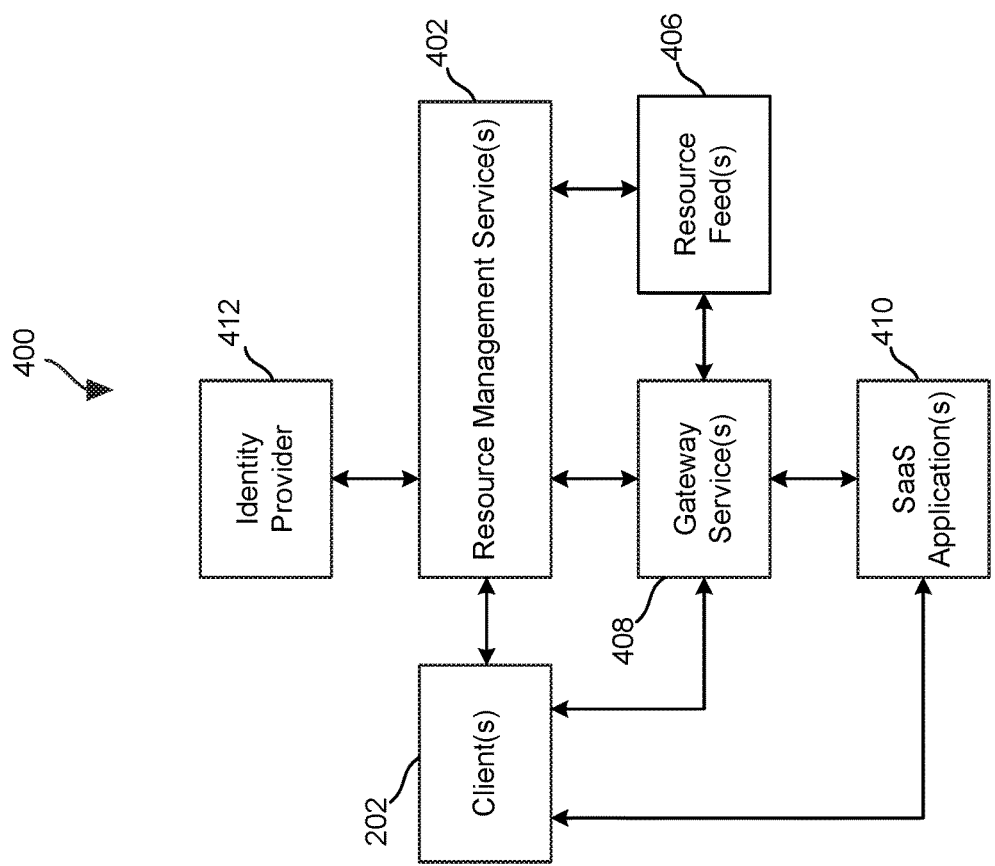
FIG. 4A is a block diagram of an example system in which resource management services may manage and streamline access by clients to resource feeds (via one or more gateway services) and/or software-as-a-service (SaaS) applications.

D. Systems and Methods for Managing and Streamlining Access by Client Devices to a Variety of Resources FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one or more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
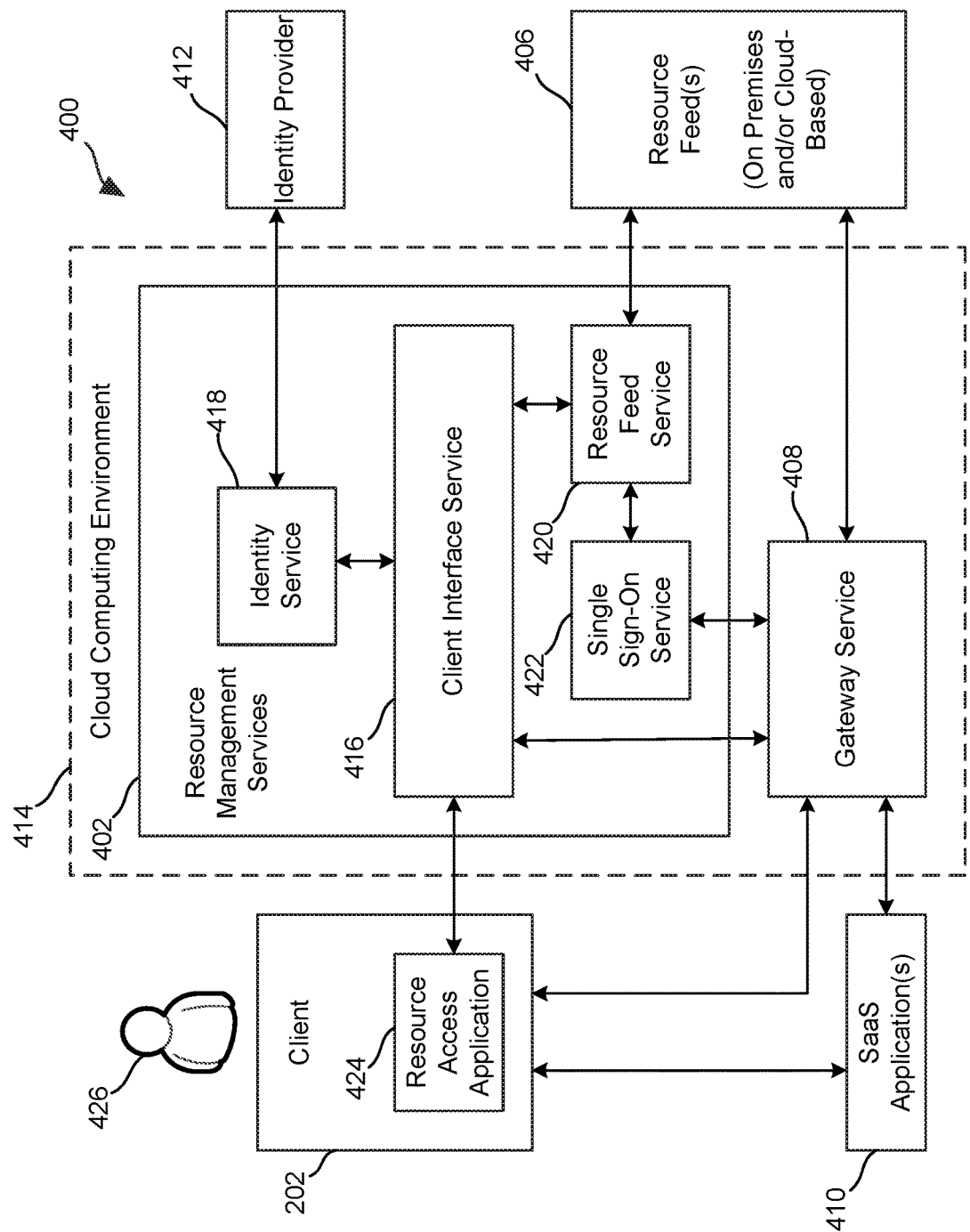
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
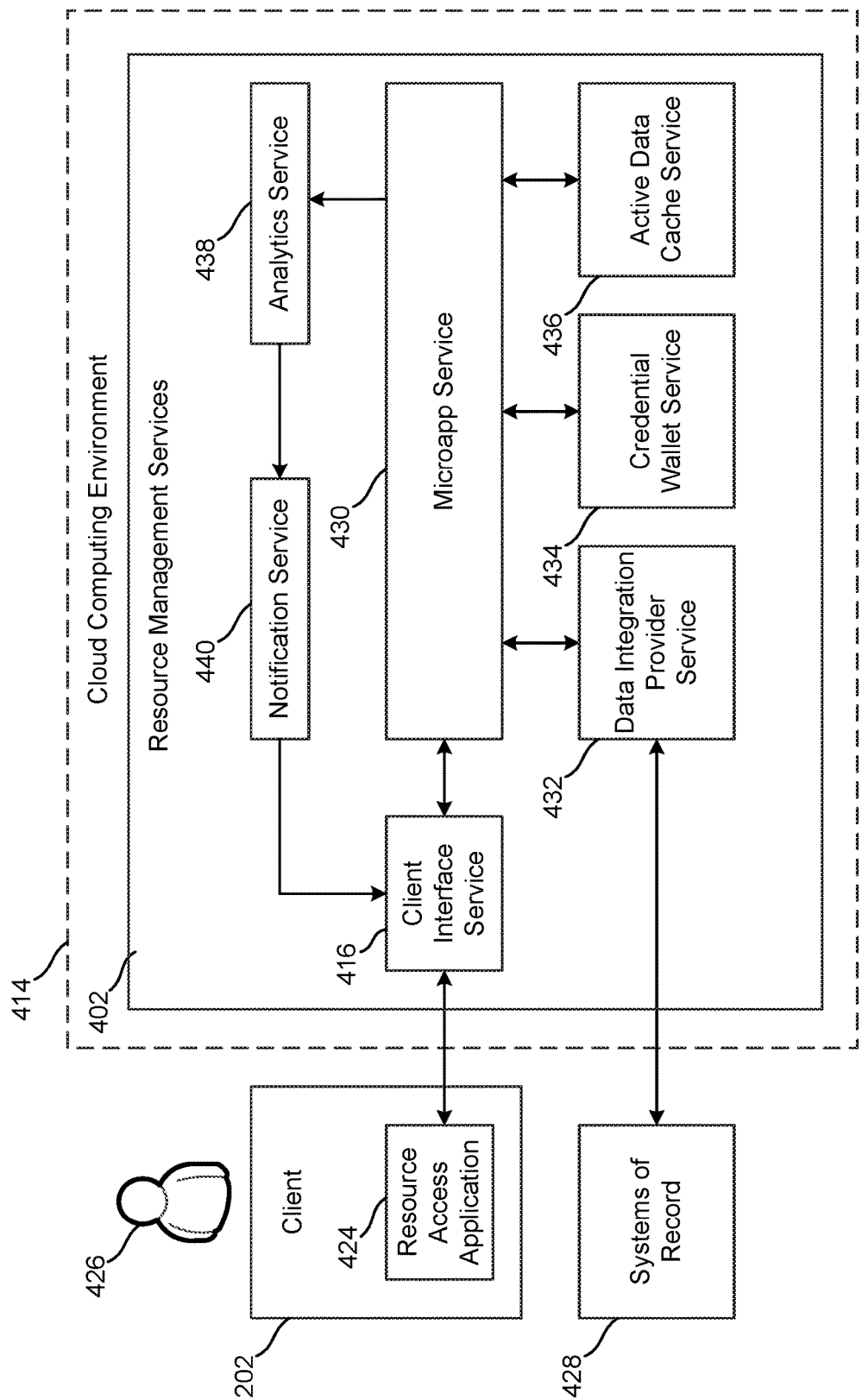
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 430 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information they are looking for.

E. Systems and Methods for Providing File Sharing Over Network(s)

Figure 5A:
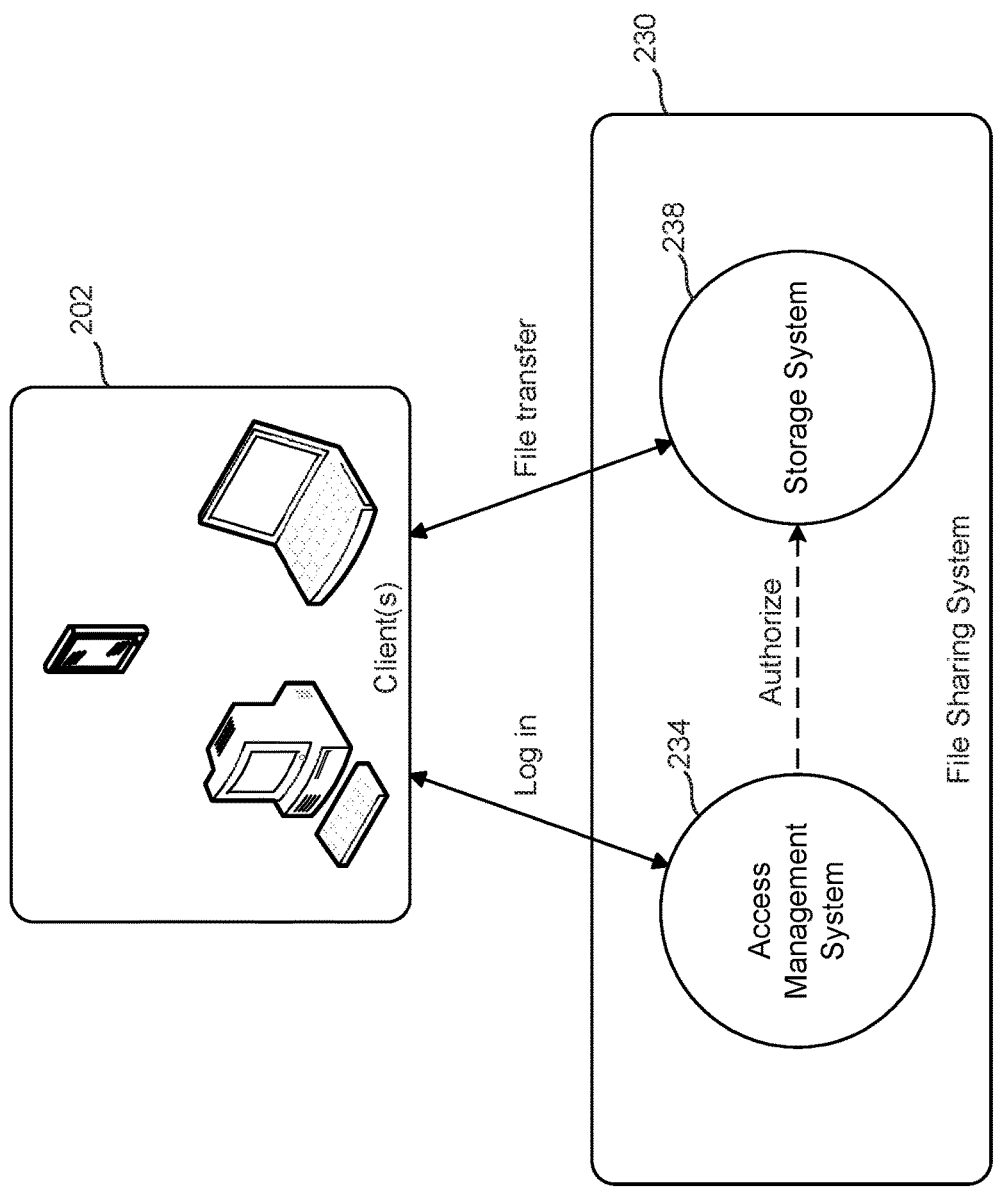
FIG. 5A is a diagram illustrating certain operations that may be performed by the file sharing system shown in FIG. 2C in accordance with some embodiments.

As discussed above in connection with FIG. 2C, in some embodiments, a file sharing system may be distributed between two sub-systems, with one subsystem (e.g., the access management system 234) being responsible for controlling access to files 228 stored in the other subsystem (e.g., the storage system 238). FIG. 5A illustrates conceptually how one or more clients 202 may interact with two such subsystems.

As shown in FIG. 5A, an authorized user operating a client 202, which may take on any of numerous forms, may log in to the access management system 234, for example, by entering a valid user name and password. In some embodiments, the access management system 234 may include one or more webservers that respond to requests from the client 202. The access management system 234 may store metadata concerning the identity and arrangements of files 228 (shown in FIG. 2C) stored by the storage system 238, such as folders maintained by the storage system 238 and any files 228 contained within such folders. In some embodiments, the metadata may also include permission metadata identifying the folders and files 228 each user is allowed to access. Once logged in, the user may employ a user-interface mechanism of the client 202 to navigate among folders for which the metadata indicates the user has access permission.

In some embodiments, the logged-in user may select a particular file 228 the user wants to access and/or to which the logged-in user wants a different user of a different client 202 to be able to access. Upon receiving such a selection from a client 202, the access management system 234 may take steps to authorize access to the selected file 228 by the logged-in client 202 and/or the different client 202. In some embodiments, for example, the access management system 234 may interact with the storage system 238 to obtain a unique "download" token which may subsequently be used by a client 202 to retrieve the identified file 228 from the storage system 238. The access management system 234 may, for example, send the download token to the logged-in client 202 and/or a client 202 operated by a different user. In some embodiments, the download token may a single-use token that expires after its first use.

In some embodiments, the storage system 238 may also include one or more webservers and may respond to requests from clients 202. In such embodiments, one or more files 228 may be transferred from the storage system 238 to a client 202 in response to a request that includes the download token. In some embodiments, for example, the download token may be appended to a URL that resolves to an IP address of the webserver(s) of the storage system 238. Access to a given file 228 may thus, for example, be enabled by a "download link" that includes the URL/token. Such a download link may, for example, be sent the logged-in client 202 in the form of a "DOWNLOAD" button or other user-interface element the user can select to effect the transfer of the file 228 from the storage system 238 to the client 202. Alternatively, the download link may be sent to a different client 202 operated by an individual with which the logged-in user desires to share the file 228. For example, in some embodiments, the access management system 234 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 234 and cut-and-paste or otherwise copy the download link into an email or other message the logged in user can then send to the other client 202 to enable the other client 202 to retrieve the file 228 from the storage system 238.

In some embodiments, a logged-in user may select a folder on the file sharing system to which the user wants to transfer one or more files 228 (shown in FIG. 2C) from the logged-in client 202, or to which the logged-in user wants to allow a different user of a different client 202 to transfer one or more files 228. Additionally or alternatively, the logged-in user may identify one or more different users (e.g., by entering their email addresses) the logged-in user wants to be able to access one or more files 228 currently accessible to the logged-in client 202.

Similar to the file downloading process described above, upon receiving such a selection from a client 202, the access management system 234 may take steps to authorize access to the selected folder by the logged-in client 202 and/or the different client 202. In some embodiments, for example, the access management system 234 may interact with the storage system 238 to obtain a unique "upload token" which may subsequently be used by a client 202 to transfer one or more files 228 from the client 202 to the storage system 238. The access management system 234 may, for example, send the upload token to the logged-in client 202 and/or a client 202 operated by a different user.

One or more files 228 may be transferred from a client 202 to the storage system 238 in response to a request that includes the upload token. In some embodiments, for example, the upload token may be appended to a URL that resolves to an IP address of the webserver(s) of the storage system 238. For example, in some embodiments, in response to a logged-in user selecting a folder to which the user desires to transfer one or more files 228 and/or identifying one or more intended recipients of such files 228, the access management system 234 may return a webpage requesting that the user drag-and-drop or otherwise identify the file(s) 228 the user desires to transfer to the selected folder and/or a designated recipient. The returned webpage may also include an "upload link," e.g., in the form of an "UPLOAD" button or other user-interface element that the user can select to effect the transfer of the file(s) 228 from the client 202 to the storage system 238.

In some embodiments, in response to a logged-in user selecting a folder to which the user wants to enable a different client 202 operated by a different user to transfer one or more files 228, the access management system 234 may generate an upload link that may be sent to the different client 202. For example, in some embodiments, the access management system 234 may send an email or other message to the different client 202 that includes a message indicating that the different user has been authorized to transfer one or more files 228 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 228 the different user wishes to upload to the file sharing system 230. The returned webpage may also include a user-interface element, e.g., in the form of an "UPLOAD" button, that the different user can select to effect the transfer of the file(s) 228 from the client 202 to the storage system 238. In other embodiments, the logged-in user may receive the upload link from the access management system 234 and may cut-and-paste or otherwise copy the upload link into an email or other message the logged-in user can then send to the different client 202 to enable the different client to upload one or more files 228 to the storage system 238.

In some embodiments, in response to one or more files 228 being uploaded to a folder, the storage system 238 may send a message to the access management system 234 indicating that the file(s) 228 have been successfully uploaded, and an access management system 234 may, in turn, send an email or other message to one or more users indicating the same. For user's that have accounts with the file sharing system 230, for example, a message may be sent to the account holder that includes a download link that the account holder can select to effect the transfer of the file 228 from the storage system 238 to the client 202 operated by the account holder. Alternatively, the message to the account holder may include a link to a webpage from the access management system 234 inviting the account holder to log in to retrieve the transferred files 228. Likewise, in circumstances in which a logged-in user identifies one or more intended recipients for one or more to-be-uploaded files 228 (e.g., by entering their email addresses), the access management system 234 may send a message including a download link to the designated recipients (e.g., in the manner described above), which such designated recipients can then use to effect the transfer of the file(s) 228 from the storage system 238 to the client(s) 202 operated by those designated recipients.

Figure 5B:
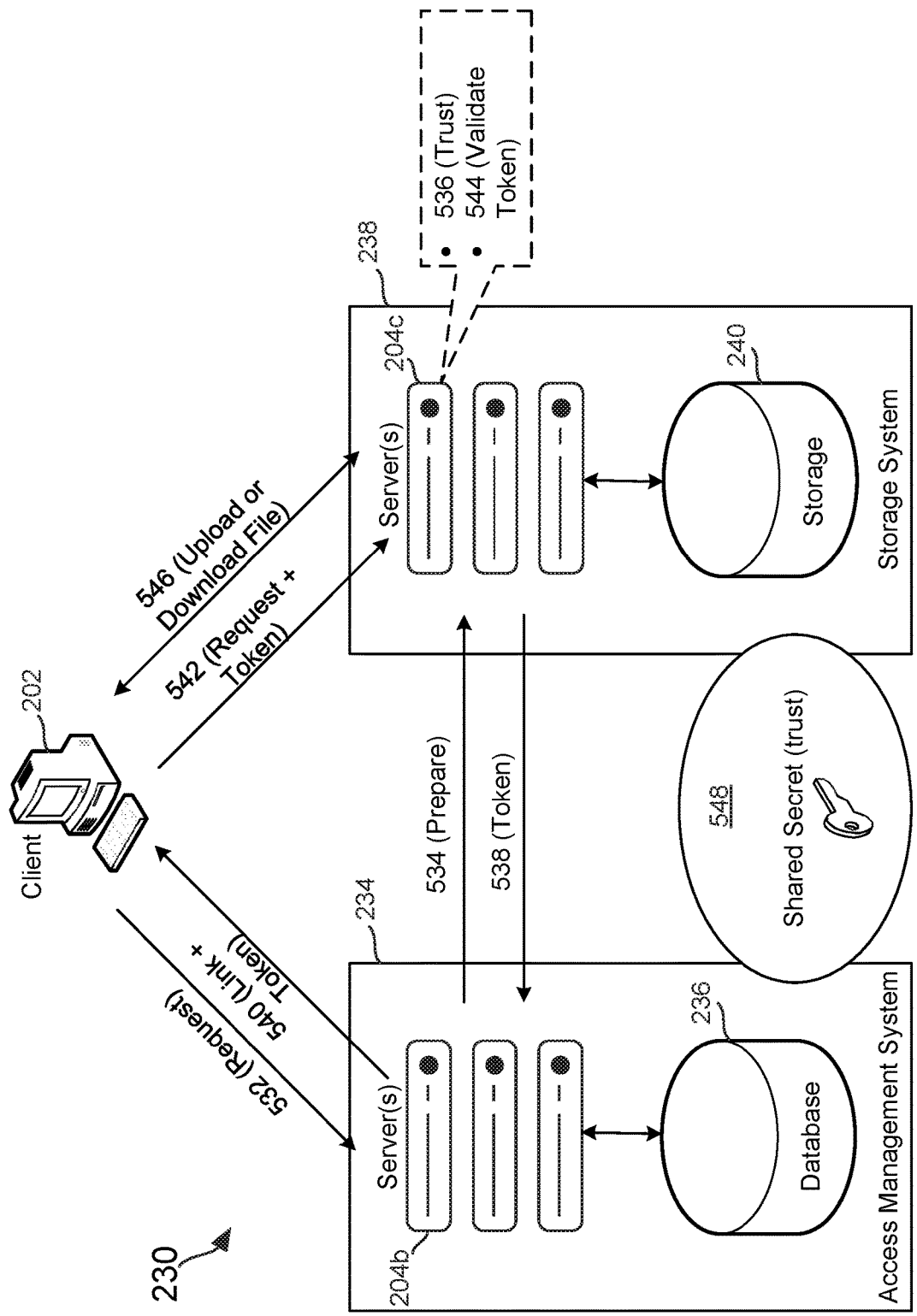
FIG. 5B is a diagram illustrating additional operations that may be performed by the file sharing system shown in FIG. 2C in accordance with some embodiments.

FIG. 5B is a block diagram showing an example of a process for generating access tokens (e.g., the upload tokens and download tokens discussed above) within the file sharing system 230 described in connection with FIGS. 2C and 5A.

As shown, in some embodiments, a logged-in client 202 may initiate the access token generation process by sending an access request 532 to the access management server(s) 204b. As noted above, the access request 532 may, for example, correspond to one or more of (A) a request to enable the downloading of one or more files 228 (shown in FIG. 2C) from the storage system 238 to the logged-in client 202, (B) a request to enable the downloading of one or more files 228 from the storage system 238 to a different client 202 operated by a different user, (C) a request to enable the uploading of one or more files 228 from a logged-in client 202 to a folder on the storage system 238, (D) a request to enable the uploading of one or more files 228 from a different client 202 operated by a different user to a folder of the storage system 238, (E) a request to enable the transfer of one or more files 228, via the storage system 238, from a logged-in client 202 to a different client 202 operated by a different user, or (F) a request to enable the transfer of one or more files 228, via the storage system 238, from a different client 202 operated by a different user to a logged-in client 202.

In response to receiving the access request 532, an access management server 204b may send a "prepare" message 534 to the storage control server(s) 204c of the storage system 238, identifying the type of action indicated in the request, as well as the identity and/or location within the storage medium 240 of any applicable folders and/or files 228. As shown, in some embodiments, a trust relationship may be established (step 536) between the storage control server(s) 204c and the access management server(s) 204b. In some embodiments, for example, the storage control server(s) 204c may establish the trust relationship by validating a hash-based message authentication code (HMAC) based on shared secret or key 548).

After the trust relationship has been established, the storage control server(s) 204c may generate and send (step 538) to the access management server(s) 204b a unique upload token and/or a unique download token, such as those as discussed above.

After the access management server(s) 204b receive a token from the storage control server(s) 204c, the access management server(s) 204b may prepare and send a link 540 including the token to one or more client(s) 202. In some embodiments, for example, the link may contain a fully qualified domain name (FQDN) of the storage control server(s) 204c, together with the token. As discussed above, the link 540 may be sent to the logged-in client 202 and/or to a different client 202 operated by a different user, depending on the operation that was indicated by the request.

The client(s) 202 that receive the token may thereafter send a request 542 (which includes the token) to the storage control server(s) 204c. In response to receiving the request, the storage control server(s) 204c may validate (step 544) the token and, if the validation is successful, the storage control server(s) 204c may interact with the client(s) 202 to effect the transfer (step 546) of the pertinent file(s) 228, as discussed above.

F. Detailed Description of Example Embodiments of a File Recommendation System

As introduced above in connection with FIG. 1, in some embodiments disclosed herein, a file recommendation system 102 may recommend one or more files to a second user 108 (or "sender") that potentially match a file requested by a first user 106 (or "recipient"). The file recommendation system 102 may analyze the content of a file request (e.g., message body, subject line, etc.) to determine information identifying the requested file. The file recommendation system 102 may then compare the determined information with metadata associated with files, e.g., file tags, that a sender is authorized to access, and may determine one or more recommended files that potentially match the requested file. The file recommendation system 102 may present the recommended file(s) to the sender, and may then send the file to the recipient after receiving approval from the sender.

Figure 6:
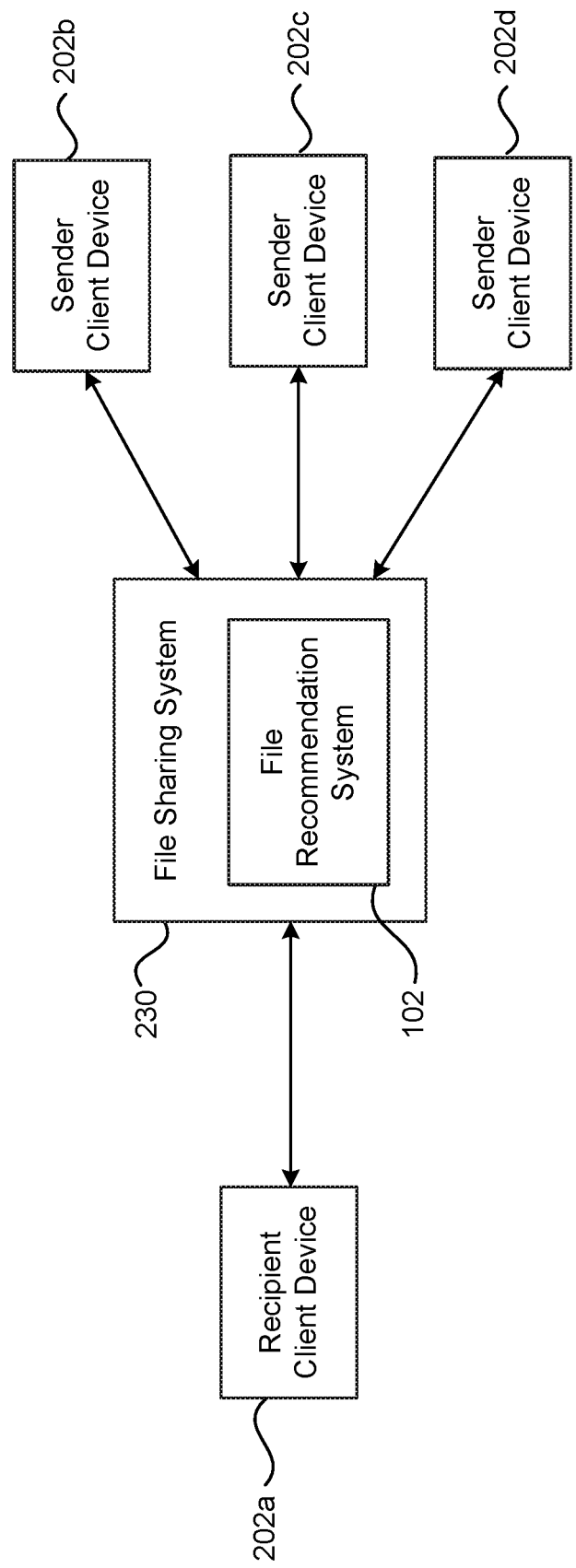
FIG. 6 is a diagram illustrating an example use of a file recommendation system in accordance with some embodiments of the present disclosure.

FIG. 6 is a diagram illustrating an example implementation of the file recommendation system 102 introduced above, in accordance with some embodiments. The recipient client device 202a shown in FIG. 6 may, for example, correspond to the recipient device 104 shown in FIG. 1, and one of the sender client devices 202b, 202c, 202d shown in FIG. 6 may, for example, correspond to the sender device 110 shown in FIG. 1. The file recommendation system 102 may be implemented remotely, e.g., by one or more servers (as illustrated in FIG. 1), or may be implemented by one or more of the recipient and/or sender client devices 202 in addition to or in lieu of one or more servers. In some embodiments, as illustrated in FIG. 6, the file recommendation system 102 may be implemented as part of the file sharing system 230 described above in connection with FIGS. 2C and 5A-B. The recipient client device 202a and the sender client device(s) 202b-202d may be in communication with the file recommendation system 102 via the file sharing system 230 using one or more networks (e.g., networks 206 of types described above). For example, the recipient client device 202a may send a message requesting a file to the file sharing system 230, which may route the message to the file recommendation system 102 for further processing. The sender client device(s) 202b-d may send, to the file recommendation system 102, a selection of a recommended file that is to be shared with the recipient client device 202a.

The users operating the client devices 202a-d may be authorized users, as described above, of the file sharing system 230 and may have logged in to their respective accounts. The user (recipient) of the recipient client device 202a may initiate a request for a file (a request to access or download the file) that one or more users (senders) have access to within their respective file repositories of the file sharing system 230. The request for the file may include information related to the file, such as a description of the file, an indication of last access or modification, a file type, a location of the user, or the like. In some embodiments, the file recommendation system 102 may cause the recipient client device 202a to present a user interface that enables a user (recipient) to compose a request for a file from one or more other users (senders). The file recommendation system 102, based on contents of the request, may then send messages to one or more sender client devices 202b-d indicating one or more recommended files that potentially match the file described in the request. In some embodiments, the file recommendation system 102 may cause a user interface to be presented on such sender client devices 202b-d that allows the sender(s) to seamlessly select a recommended file for transfer from the file sharing system 230 to the recipient client device 202a and/or authorize such a transfer. In some embodiments, for example, such a user interface may include a button, a link, or other user interface element associated with a recommended file, which the sender can select so as to cause the file sharing system 230 to transfer the recommended file to the recipient client device 202a and/or to send a link or other element to the recipient client device 102 which the recipient can then use to access and/or download the requested file.

The file recommendation system 102 may analyze the request from the recipient to determine, based on the information included in the request, one or more files that the sender has access to that potentially match the requested file. The file recommendation system 102 may then send a message to or otherwise cause one or more of the sender client devices 202b-d to present a user interface that indicates the recommended file(s) to a sender and allows the sender to select a recommended file for transfer and/or to authorize the transfer of a recommended file from the file sharing system 230 to the recipient client device 202 to fulfill the file recipient's request.

In some embodiments, the file recommendation system 102 may determine one or more file tags corresponding to individual files stored at the file sharing system 230. The file tags may be based, for example, on the filename, keywords appearing in certain sections of the file, a frequency of a keyword appearing in the file, or the like. The file recommendation system 102 may, for example, identify certain sections of a file based on their names and/or formatting such that they are identified as titles, sections, abstract, summary, agenda, or the like. From such sections, the file recommendation system 102 may extract file tags using the section names. For example, for a section named "Agenda for 2019 National Convention," the file tags may include "agenda", "National Convention" and "2019." For audio and video files, the file recommendation system 102 may convert the audio to text, and then determine the file tags for the audio file and/or the video file. The file recommendation system 102 may compare the information from the request identifying the requested file to the file tags of the files that the senders identified in the request are authorized to access.

In some implementations, the file tags may also include a timestamp identifying when the files were created, when the files were last modified, when the files were last accessed, the numbers of times the files were accessed, or the like. In some embodiments, the file tags may also indicate locations associated with the respective files. For example, if an organization has multiple offices—office A and office B—then such a "location" file tag may indicate that the file is associated with a particular office (e.g., the office A), if the file is specific to that office location.

In some embodiments, the file recommendation system 102 may determine the files the sender(s) have access to by first identifying the sender(s) to whom the request is sent and then determining one or more file repositories that include files the identified sender(s) are authorized to access. As described in relation to FIGS. 2C and 5A, the file sharing system 230 may track which files a user is authorized to access.

As noted above, the sender may select a particular file, from a list of the recommended files, for transfer to the recipient in response to the file request. In some embodiments, the file recommendation system 102 may use such selections as feedback to train the file recommendation system 102 with respect to which files the file recommendation system 102 will recommend, and/or the order in which such files will be recommended, in response to future requests containing the same or similar information.

Figure 7:
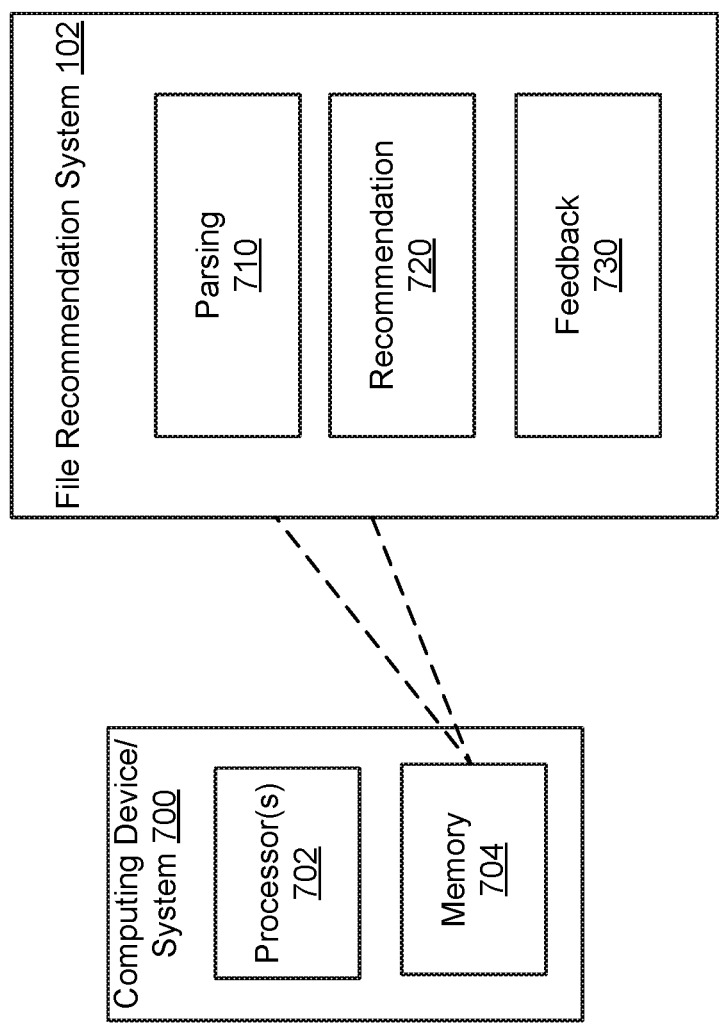
FIG. 7 is a diagram illustrating example components of a file recommendation system in accordance with some embodiments of the present disclosure.

FIG. 7 is a diagram illustrating components of an example of a file recommendation system 102 in accordance with some embodiments the present disclosure. As shown, a computing device/system 700 including one or more processor(s) 702 and memory 704 may implement components of the file recommendation system 102. The computing device/system 700 may be a server (e.g., server 204) or a client device (e.g., client 202), and the file recommendation system 102 may be an application (e.g., application 220/220' of FIG. 2B operated or executed by the computing device/system 700. As FIG. 7 illustrates, the file recommendation system 102 may include a parsing component 710, a recommendation component 720, and a feedback component 730. Each of the illustrated components may, for example, represent respective sets of instructions encoded on one or more computer-readable media that, when executed by one or more processors, cause the file recommendation system 102 to implement the functionality described herein. Although FIG. 7 shows particular components, it should be understood that the file recommendation system 102 may be configured with fewer or more component to perform the functionalities described below.

The parsing component 710 may be configured to parse a message, from a recipient, requesting one or more files from one or more senders. The parsing component 710 may receive a message (e.g., email, file sharing system message, etc.) from the recipient client device 202a, where the message may include a subject line, a message body, one or more senders from whom the file is requested, etc. The parsing component 710 may analyze the contents of the message to determine information relating to the requested file(s), where the information may be used by the recommendation component 720 to identify file(s) from a sender's file repository that potentially match the requested file. The subject line may include the name of the requested file(s) and the message body may include a description of the requested file(s). The message may identify one or more users/senders from whom the recipient is requesting the file. The parsing component 710 may employ various parsing techniques, natural language understanding techniques, syntax analysis techniques, and others to determine information from the message relating to the requested file(s).

In some embodiments, the parsing component 710 may determine a feature set, which may be represented, for example, as a feature data vector, corresponding to the message. The parsing component 710 may determine, using the message contents, a weight for individual features in the feature set, where the weight may indicate an importance level of the particular feature with respect to the other features. The weight may indicate a likelihood or probability of the feature being included in the message content and thus being important in identifying the requested file. In an example embodiment, the features may include one or more keywords, an age of the file, an access frequency of the file, type of file, and location information associated with the file.

The age of file may refer to the last time the file was accessed and/or modified, when the file was created, and/or when the file was uploaded to the file sharing system 230. The access frequency of file may refer to how often the file has been accessed by users. The type of file may be based on the file extension and/or the type of file content, for example, a document, an audio file, a video file, an image file, etc. The location information may refer to the recipient's and/or the sender's location. For example, an organization may have office spaces at multiple geographic locations and certain files in the system may be associated with particular locations based the locations of the users who uploaded or created the files. The file recommendation system 102 may, for example, take into account that a recipient at a particular location is likely to request a file that is associated with that same location.

The recommendation component 720 may be configured to recommend one or more files, from the repository/repositories of the identified sender(s), that potentially match the requested file. The recommendation component 720 may use the information determined by the parsing component 710 relating to the requested file, and may analyze metadata and file tags associated with the files in the pertinent repository/repositories to recommend one or more files to the sender as potentially matching the requested file.

In some embodiments, the recommendation component 720 may compare the feature set determined by the parsing component 710 with the file tags associated with the files in the pertinent file repository/repositories. If more than one match is found, then the recommendation component 720 may rank the files that potentially match the requested file based on various factors, such as, the age of the file, the access frequency, the type of file, and the location (if any) associated with the file. The recommendation component 720 may, for example, use the weights associated with the feature set to determine whether one or more factors associated with the file should cause the file to be ranked higher or lower as compared to the others. For example, if the request includes a location associated with the file (e.g., "send me the agenda for the Boston office meeting" or "send me the agenda for our office meeting," where the recipient is known to work at the Boston office of the organization), then the recommendation component 720 may rank the files that have file tags indicating the mentioned location higher than other files. In some embodiments, the recommendation component 720 may determine scores associated with respective files that potentially match the requested file, and may use such scores to rank the files.

The recommendation component 720 may generate an ordered list of recommended files, and may cause a sender client device 202*b-d* to output such a list (e.g., via a display) to enable a sender to view the list, and to allow the sender to select one or more of the recommended files to be transferred to the recipient client device 202*a* in response to the file request. The order of the files in the list may be based on the rank of individual files as determined by the recommendation component 720. The list of recommended files may include information related to the files, such as the filename, a file type, last modified date, or the like.

As noted above, a recipient may request a file from multiple senders, and the file recommendation system 102 may determine which of the files that each sender is authorized to access potentially matches the requested file. Since individual senders may be authorized to access a different set of files, the list of recommended files determined by the file recommendation system 102 may be different for individual senders for a particular request.

The recommendation component 720 may also be configured to cause the file(s) approved by the sender to be transferred to the recipient client device 202*a* in response to the file request. For example, if the file recommendation system 102 finds only one file from the sender's repository that matches the requested file, then the file recommendation system 102 may present information relating to the file at the sender client device 202 for approval, and once approval is received, the file recommendation system 102 may cause the file to be transferred from the file sharing system 230 to the recipient client device 202*a*, or may cause a link or other element to be sent to the recipient client device 202*a* that allows the recipient to effect such a transfer. If more than one file is found matching the requested file, then the file recommendation system 102 may present the ranked list of recommended files at the sender client device 202*a* to enable the sender to select a file, and after receiving selection of a file from the list, the file recommendation system 102 may cause the file to be transferred from the file sharing system 230 to the recipient client device 202*a*, or may cause a link or other element to be sent to the recipient client device 202*a* that allows the recipient to effect such a transfer.

The feedback component 730 may be configured to accumulate information relating to the files that are selected by senders from ranked lists of recommended files for corresponding requests. The feedback component 730 may use such collected information as feedback to train or update the recommendation algorithm(s) or technique(s) employed by the system. In some embodiments, the feedback component 730 may update the mappings between the feature set determined from the file request and the file tags.

If the sender selects the highest ranked file, then the feedback component 730 may not update any algorithms or data. If the sender selects a file other than the highest ranked file, however, then the feedback component 730 may update the algorithm/data used to determine the ranking. The feedback component 730 may, for example, update the weights associated with a feature set based on the file tags associated with the selected file. For example, if the sender selects the second ranked file, then the feedback component 730 may compare the file tags associated with the first ranked file and the file tags associated with the second ranked file to determine a difference in the tags and/or a unique tag associated with the second ranked file that caused the second file to be the requested file rather than the first ranked file. Based on that unique/different file tag, the feedback component 730 may determine to adjust the weights of the feature set associated with the request.

In a non-limiting example, a recipient may send a message requesting a file to the file recommendation system 102, where the subject line may be "National Conference presentation" and the message body may be "Can you send me the most recent version of this year's presentation and the recording from last week's meeting?" In such a case, the file recommendation system 102 may determine a data vector representing the feature set {keywords, age of file, access frequency, file type, location} corresponding to the message as {"National Conference", "modified recently", "unknown", "PowerPoint", "not relevant"}. The file recommendation system 102 may also determine another data vector, identifying that the recipient is requesting two files—a presentation and a meeting recording. The other data vector may be {"National Conference", "created/modified last week", "not specified", "audio file", "not specified"}. The file recommendation system 102 may assign weights to the features to indicate an importance of the feature with respect to the other features in identifying the requested files. For example, for the first feature set, the weights may be {"National Conference":0.5, "modified recently" 0.06, "unknown":0.03, "PowerPoint":0.4, "not relevant":0.01}, and for the second feature set, the weights may be {"National Conference":0.5, "created/modified last week": 0.11, "not specified":0.03, "word document":0.35, "not specified":0.01}.

Based on the above feature sets, the file recommendation system 102 may determine more than one file matching individual requested files. Using the weights associated with the feature sets, the file recommendation system 102 may determine how to rank the files. For example, Table 1 below shows example files that the file recommendation system 102 may identify as potentially matching the requested files.

TABLE 1

Example files that potentially match the requested files

| Filename | File type | Last accessed | Other file tags |
|---|---|---|---|
| "National Conference agenda" | Word | Modified last month | |
| "National Conference" | PowerPoint | Modified yesterday | |
| "Meeting notes" | Audio | Created last week | "National Conference" |
| "National Conference" | PowerPoint | Modified last year | |

With respect to the third file named "Meeting notes," the file recommendation engine 102 may determine the other file tag "National Conference" by converting the audio to text and performing file tagging techniques as described above (e.g., keywords, keywords frequency, identifying key sections, etc.). Using the file tags associated with the above identified files and the feature sets determined from the file request, the file recommendation system 102 may determine the below ranked list of recommended files shown in Table 2.

TABLE 2

Example files that potentially match the requested files

| Rank | Filename | File type | Last accessed | Other file tags |
|---|---|---|---|---|
| 1 | "National Conference" | PowerPoint | Modified yesterday | |
| 2 | "Meeting notes" | Audio | Created last week | "National Conference" |
| 3 | "National Conference agenda" | Word | Modified last week | |
| 4 | "National Conference" | PowerPoint | Modified last year | |

The PowerPoint file named "National Conference" that was modified yesterday may be ranked higher than the other files based on the weights of the feature set (e.g., "National Conference":0.5, "modified recently":0.06, and "PowerPoint":0.4). Furthermore, the PowerPoint file named "National Conference" that was modified last year may be ranked lowest because it was not recently modified. Similarly, the Word file named "National Conference agenda" may be ranked lower than one or more files because according to the feature set a word document likely does not match the requested file.

For illustration purposes, in an example case, the sender may select the third ranked file from the above Table 2 to send to the recipient in response to at least one of the requested files. The file recommendation system 102, as part of feedback analysis, may determine that the difference between the first ranked file and the third ranked (selected) file is that the first one is a PowerPoint file and the selected one is a Word file. The file recommendation system 102 may update the original feature set weights—{"National Conference":0.5, "modified recently":0.06, "unknown":0.03, "PowerPoint":0.4, "not relevant":0.01} to lower the weight associated with the file type feature, for example, as {"National Conference":0.7, "modified recently":0.06, "unknown":0.03, "PowerPoint":0.2, "not relevant":0.01}. Thus, the file recommendation system 102 may adjust the file type feature, in this case, to have a lower importance than previously based on the file selected by the sender.

The file recommendation system 102 may store the updated weights for the feature set along with the request message, so it can be used for future processing. That is, if a request from a recipient is received that includes similar content (similar subject line, message body, etc.) then the file recommendation system 102 may use the updated weights for the feature set corresponding to the request.

Figure 8:
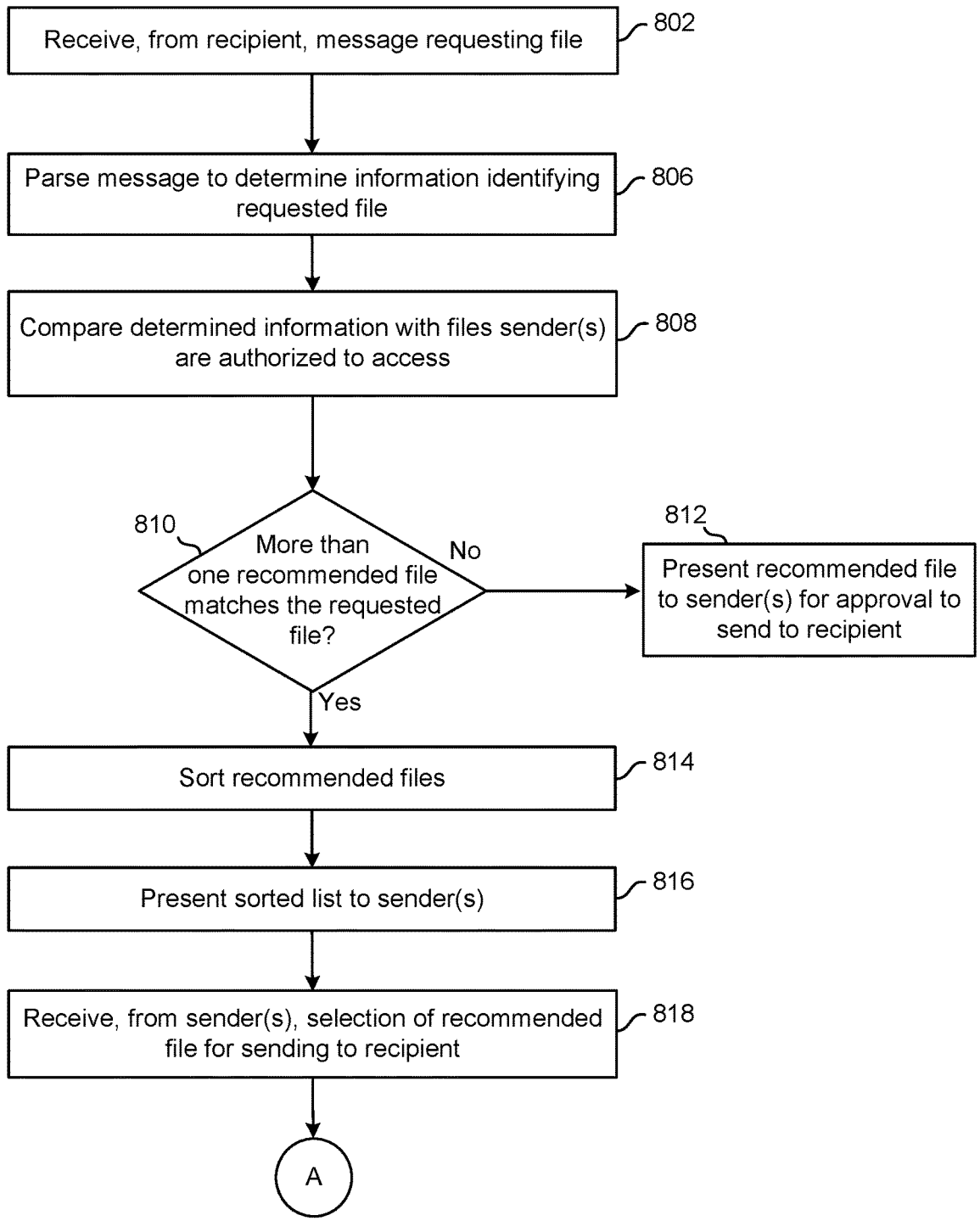
FIG. 8 illustrates a flowchart of an example process of identifying a file in a file repository that matches a requested file in accordance with some embodiments of the present disclosure.

FIG. 8 illustrates a flowchart of an example process of fetching a file from a file repository that matches a requested file in accordance with some embodiments. The process may, for example, be performed by one or more components of the file recommendation system 102 described in relation to FIG. 7. In some embodiments, the described steps may be performed by one or more processors that are configured and arranged to execute instructions encoded on one or more computer-readable media.

As shown in FIG. 8, the parsing component 710 may receive (802), from a recipient device, a message requesting a file. In some embodiments, the message may include a subject line, a message body and one or more potential senders that have access to the requested file. The parsing component 710 may parse (806) the message to determine information identifying the requested file. For example, as described above, the parsing component 710 may determine a feature set corresponding to the message.

The recommendation component 720 may compare (808) the information from the message to the files that the sender(s) are authorized to access. For example, the recommendation component 720 may compare the information determined by the parsing component 710 with file tags associated with files that the one or more senders are authorized to access. The recommendation component 720 may determine (810) whether more than one recommended file (that the sender is authorized to access) matches the requested file. If only one recommended file matches, then the recommendation component 720 may present (812) the recommended file to the sender, via the sender client device, for approval to send to the recipient in response to the message requesting the file.

If more than one recommended file matches the requested file, then the recommendation component 720 may sort (814) the recommended files to a sorted list of the recommended files. As described above, the recommendation component 720 may sort the files based on various factors such as the age of the file, the access frequency, type of file, and a location associated with the file. The recommendation component 720 may rank the files based on the information determined from the message identifying the requested file and the file tags associated with the recommended files. The recommendation component 720 may present (816) the sorted list to the sender(s) via the sender client device(s) to enable the sender(s) to select at least one file to send to the recipient in response to the message. The recommendation component 720 may receive (818), from the sender(s), selection of a recommended file from the sorted list for sending to the recipient client device. The process may continue to steps illustrated in FIG. 9.

Figure 9:
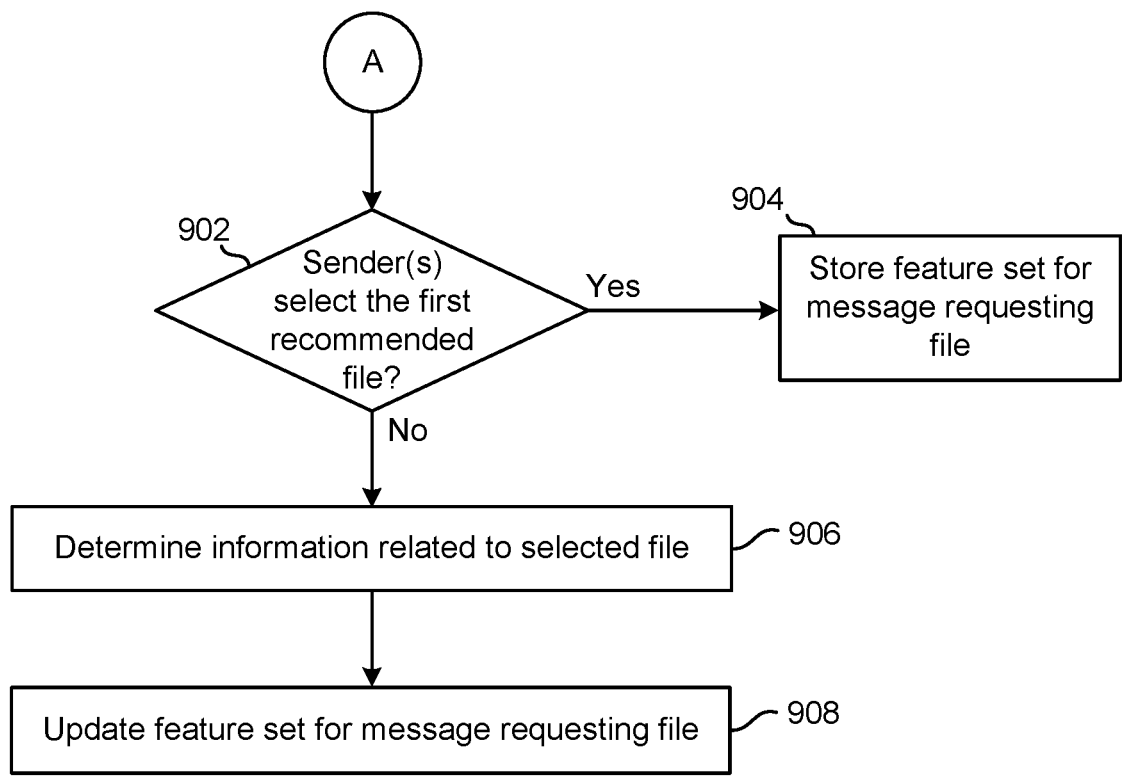
FIG. 9 illustrates a flowchart of an example process of determining feedback with respect to the recommended files in accordance with some embodiments of the present disclosure.

FIG. 9 illustrates a flowchart of an example process of determining feedback with respect to the recommended files in accordance with some embodiments. As shown in FIG. 9, the feedback component 730 may determine (902) whether the sender(s) selected the first recommended file from the sorted list (that is, the highest ranked file). If the first recommended file was selected by the sender(s), then the feedback component 730 may store (904) the feature set, along with the feature weights (determined by the parsing component 710 in step 806), for the message requesting the file.

If the sender(s) selected a file other than the first recommended file, then the feedback component 730 may determine (906) information related to the selected file, for example, using file tags associated with the selected file. The feedback component 730 may update (908) the feature set and/or the feature weights for the message requesting the file based on the file tags of the selected file.

In this manner, the file recommendation system described herein may reduce the time and effort it takes for a sender to search the sender's file repository to find a requested file. The present disclosure describes a system that may analyze a request, from a recipient, for a file, may determine which of the files a sender is authorized to access potentially matches the requested file, and may present a list of recommended files to the sender to select from for transfer to the recipient. The file recommendation system may also employ a feedback component to update how the system recommends files that potentially match the requested file. The file recommendation system of the present disclosure thus provides an improved user experience, from a sender's perspective, at least by reducing the time and effort needed to respond to a request for a file. The file recommendation system also provides an improved user experience from a recipient's perspective at least by reducing the time it takes to receive a requested file.

G. Example Implementations of Methods, Systems, and Computer-Readable Media in Accordance with the Present Disclosure The following paragraphs (M1) through (M13) describe examples of methods that may be implemented in accordance with the present disclosure.

(M1) A computing system may perform a method that involves receiving, from a first computing device, a request for a file, the request identifying at least one user who has access to the file and including information indicative of the file. The method further involves identifying, based at least in part on the received request, the file within a repository of files, and sending, to a second computing device, a first indication of the request to access the file. The method also involves receiving, from the second computing device, a second indication that the file is to be made accessible via the first computing device, and causing, based at least in part on the second indication, the file to be transferred from the repository to the first computing device.

(M2) A method may be performed as described in paragraph (M1), and may further comprise parsing the information to determine one or more features indicative of the file.

(M3) A method may be performed as described in paragraph (M1) or (M2) wherein the one or more features indicate at least one of a name of the file, an age of the file, an access frequency of the file, a type of the file, or a location associated with the file.

(M4) A method may be performed as described in any of paragraphs (M1) through (M3), and may further comprise determining a feature from the information indicative of the file, determining a weight associated with the feature, the weight indicating importance of the feature, and using the feature and the weight to identify the file within the repository of files.

(M5) A method may be performed as described in any of paragraphs (M1) through (M4), and wherein identifying the file within the repository of files may further comprise identifying file tags associated with files in the repository, and comparing the information in the received request with the file tags.

(M6) A method may be performed as described in any of paragraphs (M1) through (M5), and may further comprise identifying, based at least in part on the request, two or more recommended files potentially matching the requested file within the repository of files, the two or more recommended files including the file, causing the second computing device to output a list of the recommended files, and receiving, from the second computing device, a message indicating selection of the file from the list of recommended files, the message representing the second indication.

(M7) A method may be performed as described in any of paragraphs (M1) through (M6) and may further comprise causing the second computing device to present the list of recommended files in a ranked order, determining that the selected file is other than a highest ranked file of the list or recommended files, determining metadata associated with the selected file, and updating, based at least in part on the metadata, one or more weights corresponding to one or more features determined from the information in the request.

(M8) A computing system may perform a method that involves receiving a message including information describing a requested file, where the message identifying a user who has access to the requested file, analyzing the information to determine at least one feature associated with the requested file, and determining a plurality of files that the identified user is authorized to access. The method also involves determining file tags associated with the plurality of files, comparing the at least one feature with the file tags to determine a list of recommended files from the plurality of files, and causing a computing device of the identified user to display the list of recommended files.

(M9) A method may be performed as described in paragraph (M8), and may further comprise receiving selection of a file from the list of recommended files, and causing the selected file to be transferred to a recipient device that sent the message.

(M10) A method may be performed as described in paragraph (M8) or (M9), and may further comprise causing the computing device of the identified user to present the list of recommended files in a ranked order, determining that the selected file is other than a highest ranked file of the list of recommended files, determining file tags associated with the selected file, and updating a weight associated with the at least one feature determined from the message.

(M11) A method may be performed as described in any of paragraphs (M8) through (M10), wherein analyzing the information comprises parsing the information to determine a feature vector including one or more features indicative of the requested file.

(M12) A method may be performed as described in any of paragraphs (M8) through (M11), wherein the at least one feature indicates at least one of a file tag associated with the requested file, an age of the requested file, an access frequency of the requested file, a type of the requested file, or a location associated with the requested file.

(M13) A method may be performed as described in any of paragraphs (M8) through (M12), and may further comprise determining a weight associated with the at least one feature, the weight indicating importance of the at least one feature, and using the at least one feature and the weight to determine the list of recommended files.

The following paragraphs (S1) through (S3) describe examples of systems that may be implemented in accordance with the present disclosure.

(S1) A system may comprise at least one processor and at least one computer-readable medium encoded with instructions which, when executed by the at least one processor, may cause the system to receive, from a first computing device, a request for a file, the request identifying at least one user who has access to the file and including information indicative of the file, identify, based at least in part on the received request, the file within a repository of files, send, to a second computing device, a first indication of the request to access the file, receive, from the second computing device, a second indication that the file is to be made accessible via the first computing device, and cause, based at least in part on the second indication, the file to be transferred from the repository to the first computing device.

(S2) A system may be configured as described in paragraph (S1), wherein the at least one computer-readable medium is encoded with additional instructions which, when executed by the at least one processor, may further cause the system to parse the information to determine one or more features indicative of the file.

(S3) A system may be configured as described in paragraph (S1) or (S2), wherein the one or more features indicate at least one of a name of the file, an age of the file, an access frequency of the file, a type of the file, or a location associated with the file.

(S4) A system may be configured as described in any of paragraphs (S1) through (S3), wherein the at least one computer-readable medium is encoded with additional instructions which, when executed by the at least one processor, may further cause the system to determine a feature from the request indicative of the file, determine a weight associated with the feature, the weight indicating importance of the feature, and use the feature and the weight to identify the file within the repository of files.

(S5) A system may be configured as described in any of paragraphs (S1) through (S4), wherein the at least one computer-readable medium is encoded with additional instructions which, when executed by the at least one processor, may further cause the system to identify file tags associated with the files in the repository, and compare the information in the received request with the file tags.

(S6) A system may be configured as described in any of paragraphs (S1) through (S5), wherein the at least one computer-readable medium is encoded with additional instructions which, when executed by the at least one processor, may further cause the system to identify, based at least in part on the request, two or more recommended files potentially matching the requested file within the repository of files, the two or more recommended files including the file, cause the second computing device to output a list of the recommended files, and receive, from the second computing device, a message indicating selection of the file from the list of recommended files, the message representing the second indication.

(S7) A system may be configured as described in any of paragraphs (S1) through (S6), wherein the at least one computer-readable medium is encoded with additional instructions which, when executed by the at least one processor, may further cause the system to cause the second computing device to present the list of recommended files in a ranked order, determine that the selected file is other than a highest ranked file of the list of recommended files, determine metadata associated with the selected file, and update, based at least in part on the metadata, one or more weights corresponding to one or more features determined from the information in the request.

(S8) A system may comprise at least one processor and at least one computer-readable medium encoded with instructions which, when executed by the at least one processor, may cause the system to receive a message including information describing a requested file, where the message identifying a user who has access to the requested file, analyze the information to determine at least one feature associated with the requested file, and determine a plurality of files that the identified user is authorized to access, determine file tags associated with the plurality of files, compare the at least one feature with the file tags to determine a list of recommended files from the plurality of files, and cause a computing device of the identified user to display the list of recommended files.

(S9) A system may be configured as described in paragraph (S8), wherein the at least one computer-readable medium is encoded with additional instructions which, when executed by the at least one processor, may further cause the system to receive selection of a file from the list of recommended files, and causing the selected file to be transferred to a recipient device that sent the message.

(S10) A system may be configured as described in any of paragraphs (S8) or (S9), wherein the at least one computer-readable medium is encoded with additional instructions which, when executed by the at least one processor, may further cause the system to cause the computing device of the identified user to present the list of recommended files in a ranked order, determine that the selected file is other than a highest ranked file of the list of recommended files, determine file tags associated with the selected file, and update a weight associated with the at least one feature determined from the message.

(S11) A system may be configured as described in any of paragraphs (S8) through (S10), wherein analyzing the information comprises parsing the information to determine a feature vector including one or more features indicative of the requested file.

(S12) A system may be configured as described in any of paragraphs (S8) through (S11), wherein the at least one feature indicates at least one of a file tag associated with the requested file, an age of the requested file, an access frequency of the requested file, a type of the requested file, or a location associated with the requested file.

(S13) A system may be configured as described in any of paragraphs (S8) through (S12), wherein the at least one computer-readable medium is encoded with additional instructions which, when executed by the at least one processor, may further cause the system to determine a weight associated with the at least one feature, the weight indicating importance of the at least one feature, and use the at least one feature and the weight to determine the list of recommended files.

The following paragraphs (CRM1) through (CRM17) describe examples of computer-readable media that may be implemented in accordance with the present disclosure.

(CRM1) At least one non-transitory, computer-readable medium may be encoded with instructions which, when executed by at least one processor included in a first computing system, cause the at least one processor to receive, from a first computing device, a request for a file, the request identifying at least one user who has access to the file and including information indicative of the file, identify, based at least in part on the request, the file within a repository of files, send, to a second computing device, a first indication of the request to access the file, receive, from the second computing device, a second indication that the file is to be made accessible via the first computing device, and cause, based at least in part on the second indication, the file to be transferred from the repository to the first computing device.

(CRM2) At least one non-transitory, computer-readable medium may be encoded with instructions as described in paragraph (CRM1), and may be further encoded with additional instructions which, when executed by the at least one processor, may further cause the at least one processor to parse the information to determine one or more features indicative of the file.

(CRM3) At least one non-transitory, computer-readable medium may be encoded with instructions as described in paragraph (CRM1) or paragraph (CRM2), wherein the one or more features indicate at least one of a name of the file, an age of the file, an access frequency of the file, a type of the file, or a location associated with the file.

(CRM4) At least one non-transitory, computer-readable medium may be encoded with instructions as described in any of paragraphs (CRM1) through (CRM3), and may be further encoded with additional instructions which, when executed by the at least one processor, may further cause the at least one processor to determine a feature from the request indicative of the file, determine a weight associated with the feature, the weight indicating importance of the feature, and use the feature and the weight to identify the file within the repository of files.

(CRM5) At least one non-transitory, computer-readable medium may be encoded with instructions as described in any of paragraphs (CRM1) through (CRM4), and may be further encoded with additional instructions which, when executed by the at least one processor, may further cause the at least one processor to identify file tags associated with the files in the repository, and compare the information in the received request with the file tags.

(CRM6) At least one non-transitory, computer-readable medium may be encoded with instructions as described in any of paragraphs (CRM1) through (CRM5), wherein the request from the first endpoint device includes a session identifier, and may be further encoded with additional instructions which, when executed by the at least one processor, may further cause the at least one processor to identify, based at least in part on the request, two or more recommended files potentially matching the requested file within the repository of files, the two or more recommended files including the file, cause the second computing device to output a list of the recommended files, and receive, from the second computing device, a message indicating selection of the file from the list of recommended files, the message representing the second indication.

(CRM7) At least one non-transitory, computer-readable medium may be encoded with instructions as described in any of paragraphs (CRM1) through (CRM6), and may be further encoded with additional instructions which, when executed by the at least one processor, may further cause the at least one processor to cause the second computing device to present the list of recommended files in a ranked order, determine that the selected file is other than a highest ranked file of the list of recommended files, determine metadata associated with the selected file, and update, based at least in part on the metadata, one or more weights corresponding to one or more features determined from the information in the request.

(CRM8) At least one non-transitory, computer-readable medium may be encoded with instructions which, when executed by at least one processor included in a first computing system, cause the at least one processor to receive a message including information describing a requested file, where the message identifying a user who has access to the requested file, analyze the information to determine at least one feature associated with the requested file, and determine a plurality of files that the identified user is authorized to access, determine file tags associated with the plurality of files, compare the at least one feature with the file tags to determine a list of recommended files from the plurality of files, and cause a computing device of the identified user to display the list of recommended files.

(CRM9) At least one non-transitory, computer-readable medium may be encoded with instructions as described in paragraph (CRM8), may be further encoded with additional instructions which, when executed by the at least one processor, may further cause the at least one processor to receive selection of a file from the list of recommended files, and causing the selected file to be transferred to a recipient device that sent the message.

(CRM10) At least one non-transitory, computer-readable medium may be encoded with instructions as described in any of paragraphs (CRM8) or (CRM9), may be further encoded with additional instructions which, when executed by the at least one processor, may further cause the at least one processor to cause the computing device of the identified user to present the list of recommended files in a ranked order, determine that the selected file is other than a highest ranked file of the list of recommended files, determine file tags associated with the selected file, and update a weight associated with the at least one feature determined from the message.

(CRM11) At least one non-transitory, computer-readable medium may be encoded with instructions as described in any of paragraphs (CRM8) through (CRM10), wherein analyzing the information comprises parsing the information to determine a feature vector including one or more features indicative of the requested file.

(CRM12) At least one non-transitory, computer-readable medium may be encoded with instructions as described in any of paragraphs (CRM8) through (CRM11), wherein the at least one feature indicates at least one of a file tag associated with the requested file, an age of the requested file, an access frequency of the requested file, a type of the requested file, or a location associated with the requested file.

(CRM13) At least one non-transitory, computer-readable medium may be encoded with instructions as described in any of paragraphs (CRM8) through (CRM12), may be further encoded with additional instructions which, when executed by the at least one processor, may further cause the at least one processor to determine a weight associated with the at least one feature, the weight indicating importance of the at least one feature, and use the at least one feature and the weight to determine the list of recommended files.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   receiving, by a computing system and from a first computing device, a request for a file, the request identifying at least one user of a second computing device who has access to the file, the request including information describing the file;
   identifying, by the computing system and based at least in part on the received request, the file within a repository of files;
   sending, by the computing system and to the second computing device, a first indication of the request to access the file;
   receiving, from the second computing device, a second indication that the file is to be made accessible via the first computing device; and
   causing, based at least in part on the second indication, the file to be transferred from the repository to the first computing device.

2. The method of claim 1, further comprising:
   parsing the information, included in the request, to determine one or more features indicative of the file.

3. The method of claim 2, wherein the one or more features indicate at least one of a name of the file, an age of the file, an access frequency of the file, a type of the file, or a location associated with the file.

4. The method of claim 1, further comprising:
   determining a feature from the information describing the file;
   determining a weight associated with the feature, the weight indicating importance of the feature; and
   using the feature and the weight to identify the file within the repository of files.

5. The method of claim 1, wherein identifying the file within the repository of files comprises:
   identifying file tags associated with files in the repository; and
   comparing the information in the received request with the file tags.

6. The method of claim 1, further comprising:
   identifying, based at least in part on the request, two or more recommended files potentially matching the requested file within the repository of files, the two or more recommended files including the file;
   causing the second computing device to output a list of the recommended files; and
   receiving, from the second computing device, a message indicating selection of the file from the list of recommended files, the message representing the second indication.

7. The method of claim 6, further comprising:
   causing the second computing device to present the list of recommended files in a ranked order;
   determining that the selected file is other than a highest ranked file of the list of recommended files;
   determining metadata associated with the selected file; and
   updating, based at least in part on the metadata, one or more weights corresponding to one or more features determined from the information in the request.

8. A system, comprising:
   at least one processor; and
   at least one computer-readable medium encoded with instructions which, when executed by the at least one processor, cause the system to:
   receive, from a first computing device, a request for a file, the request identifying at least one user of a second computing device who has access to the file the request including information describing the file;
   identify, based at least in part on the received request, the file within a repository of files;

send, to the second computing device, a first indication of the request to access the file;

receive, from the second computing device, a second indication that the file is to be made accessible via the first computing device; and cause, based at least in part on the second indication, the file to be transferred from the repository to the first computing device.

9. The system of claim 8, wherein the at least one computer-readable medium is encoded with additional instructions which, when executed by the at least one processor, further cause the system to:

parse the information included in the request to determine one or more features indicative of the file.

10. The system of claim 9, wherein the one or more features indicate at least one of a name of the file, an age of the file, an access frequency of the file, a type of the file, or a location associated with the file.

11. The system of claim 8, wherein the at least one computer-readable medium is encoded with additional instructions which, when executed by the at least one processor, further cause the system to:

determine a feature from the received request describing the file;

determine a weight associated with the feature, the weight indicating importance of the feature; and use the feature and the weight to identify the file within the repository of files.

12. The system of claim 8, wherein the at least one computer-readable medium is encoded with additional instructions which, when executed by the at least one processor, further cause the system to:

identify file tags associated with the files in the repository; and compare the information in the received request with the file tags.

13. The system of claim 8, wherein the at least one computer-readable medium is encoded with additional instructions which, when executed by the at least one processor, further cause the system to:

identify, based at least in part on the request, two or more recommended files potentially matching the requested file within the repository of files, the two or more recommended files including the file;

cause the second computing device to output a list of the recommended files; and receive, from the second computing device, a message indicating selection of the file from the list of recommended files, the message representing the second indication.

14. The system of claim 13, wherein the at least one computer-readable medium is encoded with additional instructions which, when executed by the at least one processor, further cause the system to:

cause the second computing device to present the list of recommended files in a ranked order;

determine that the selected file is other than a highest ranked file of the list of recommended files;

determine metadata associated with the selected file; and update, based at least in part on the metadata, one or more weights corresponding to one or more features determined from the information in the request.

15. A method, comprising:

receiving, by a computing system, a message including information describing a requested file, the message identifying a user who has access to the requested file;

analyzing, by the computing system, the information to determine at least one feature associated with the requested file;

determining, by the computing system, a plurality of files that the identified user is authorized to access;

determining, by the computing system, file tags associated with the plurality of files;

comparing, by the computing system, the at least one feature with the file tags to determine a list of recommended files from the plurality of files; and causing, by the computing system, a computing device of the identified user to display the list of recommended files.

16. The method of claim 15, further comprising:

receiving, by the computing system, selection of a file from the list of recommended files; and causing, by the computing system, the selected file to be transferred to a recipient device that sent the message.

17. The method of claim 16, further comprising:

causing, by the computing system, the computing device of the identified user to present the list of recommended files in a ranked order;

determining, by the computing system, that the selected file is other than a highest ranked file of the list of recommended files;

determining, by the computing system, file tags associated with the selected file; and updating, by the computing system, a weight associated with the at least one feature determined from the message.

18. The method of claim 15, wherein analyzing the information comprises parsing the information to determine a feature vector including one or more features indicative of the requested file.

19. The method of claim 15, wherein the at least one feature indicates at least one of a file tag associated with the requested file, an age of the requested file, an access frequency of the requested file, a type of the requested file, or a location associated with the requested file.

20. The method of claim 15, further comprising:

determining, by the computing system, a weight associated with the at least one feature, the weight indicating importance of the at least one feature; and using, by the computing system, the at least one feature and the weight to determine the list of recommended files.

* * * * *